US007737233B2

(12) United States Patent
Obrecht et al.

(10) Patent No.: US 7,737,233 B2
(45) Date of Patent: Jun. 15, 2010

(54) CATALYST SYSTEMS AND THEIR USE FOR METATHESIS REACTIONS

(75) Inventors: Werner Obrecht, Moers (DE); Kirstin Langfeld, Berlin (DE); Martin Schneider, Munich (DE); Oskar Nuyken, Munich (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/193,292

(22) Filed: Aug. 18, 2008

(65) Prior Publication Data

US 2009/0069516 A1 Mar. 12, 2009

(30) Foreign Application Priority Data

Aug. 21, 2007 (DE) .................. 10 2007 039 526

(51) Int. Cl.
B32B 31/00 (2006.01)
C08F 4/80 (2006.01)
C08F 4/78 (2006.01)

(52) U.S. Cl. .................. 526/126; 526/145; 526/147; 526/146; 526/172; 502/152; 502/155; 502/167; 156/306.9; 156/307.5; 156/307.7; 156/310; 156/327

(58) Field of Classification Search .................. 526/126, 526/145, 146, 147, 172; 502/152, 155, 167; 156/306.9, 307.5, 307.7, 310, 327
See application file for complete search history.

(56) References Cited

U.S. PATENT DOCUMENTS

| | | | |
|---|---|---|---|
| 3,700,637 A | 10/1972 | Finch, Jr. .................. 260/83.3 |
| 4,464,515 A | 8/1984 | Rempel et al. .............. 525/338 |
| 4,503,196 A | 3/1985 | Rempel et al. .............. 525/338 |
| 4,581,417 A | 4/1986 | Buding et al. ............... 525/338 |
| 4,631,315 A | 12/1986 | Buding et al. ............... 525/338 |
| 4,746,707 A | 5/1988 | Fiedler et al. ............... 525/338 |
| 4,795,788 A | 1/1989 | Himmler et al. ............. 525/338 |
| 4,812,528 A | 3/1989 | Rempel et al. .............. 525/338 |
| 4,978,771 A | 12/1990 | Fiedler et al. ............... 558/459 |
| 5,728,917 A | 3/1998 | Grubbs et al. .............. 585/653 |
| 5,831,108 A | 11/1998 | Grubbs et al. .............. 556/21 |
| 6,610,626 B2 | 8/2003 | Grubbs et al. .............. 502/155 |
| 6,673,881 B2 | 1/2004 | Guerin .................. 526/160 |
| 6,683,136 B2 | 1/2004 | Guo et al. ................. 525/329.3 |
| 6,780,939 B2 | 8/2004 | Guerin et al. .............. 525/329.1 |
| 6,818,586 B2 * | 11/2004 | Grubbs et al. .............. 502/155 |
| 6,841,623 B2 | 1/2005 | Guerin et al. .............. 525/230 |
| 6,867,303 B2 | 3/2005 | Grela .................... 548/101 |
| 7,205,424 B2 | 4/2007 | Nolan .................... 556/136 |
| 7,329,758 B1 | 2/2008 | Grubbs et al. .............. 548/103 |
| 2002/0107138 A1 | 8/2002 | Hoveyda et al. ............. 502/152 |
| 2003/0236427 A1 | 12/2003 | Grubbs et al. .............. 558/238 |
| 2004/0127647 A1 | 7/2004 | Ong et al. ................. 525/191 |

FOREIGN PATENT DOCUMENTS

| | | |
|---|---|---|
| DE | 25 39 132 | 3/1977 |
| EP | 0 419 952 | 4/1991 |
| EP | 0 471 250 | 2/1992 |

OTHER PUBLICATIONS

Organometallics, 2001, 20, 5314-5318, Sanford, Love, Grubbs, "A Versatile Precursor for the Synthesis of New Ruthenium Olefin Metathesis Catalysts".
Angew. Chem. Int. Ed. 2002, 41, No. 21 4038-4040, Grela et al, "A Highly Efficient Ruthenium Catalyst for Metathesis Reactions".
J. Am. Chem. Soc. 1997, 119, 3887-3897, XP-002433026, "Well-Defined Ruthenium Olefin Metathesis Catalysts: Mechanism and Activity" Dias, Nguyen, Grubbs.
Inorganic Chimica Acta 359 (2006) 2910-2917; Elsevier; Wolfgang H. Meyer et al; "Tin and Iron Halogenides as additives in ruthenium-catalyzed olefin metathesis".
Angew. Chem. Int. Ed. 2003, 42, 4592-4633, Schrock, and Hoveyda; "Molybdenum and Tungsten Imido Alkylidene Complexes as Efficient Olefin-Metathesis Catalysts".
Eur. J. Org. Chem. 2003, 963-966, Greta et al; "A Good Bargain: An Inexpensive, Air-Stable Ruthenium Metathesis Catalyst Derived from α-Asarone".
Platinum Metals Rev., 2005, 49(3), 123-137; Valerian Dragutan and Ileana Dragutan; Ruthenium Complexes Bearing N-Heterocyclic Carbene (NHC) Ligands.
J. Org. Chem. 2004, 69, pp. 6894-6896, "Ortho- and Para-Substituted Hoveyda-Grubbs Carbenes. An improved Synthesis of Highly Efficient Metathesis Initiators".
Chem. Eur. J. 2004, 10, pp. 777-784, Nuyken, Krause, Wurst, and Buchmeiser: "Synthesis and Reactivity of Homogeneous and Heterogeneous Ruthenium-Based Metathesis Catalysts Containing Electron-Withdrawing Ligands".
Angew. Chem. Int. Ed. 2004, 43, 6161-6165, "Rapidly Initiating Ruthenium Olefin-Metathesis Catalysts" Romero, Piers and McDonald.
ChemBioChem, 2003, 4, 1229-1231; Roberts, Konkar and Sampson; XP-002433024 "Comparison Of Fertilinβ-Peptide-Substituted Polymers and Liposomes as Inhibitors of In Vitro Fertilization".
J. Org. Chem. 2003, 68, 2022-2023; Roberts and Sampson; "Increased Polymer Length of Oligopeptide-Substituted Polynorbornenes" XP-002433025.

* cited by examiner

*Primary Examiner*—Robert D. Harlan
(74) *Attorney, Agent, or Firm*—Jennifer R. Seng

(57) ABSTRACT

Novel catalyst systems for metathesis reactions, in particular for the metathesis of nitrile rubber, which contain a specific salt additive in addition to the metathesis catalyst are provided.

38 Claims, No Drawings

CATALYST SYSTEMS AND THEIR USE FOR METATHESIS REACTIONS

FIELD OF THE INVENTION

The present invention relates to catalyst systems and their use for catalysis of metathesis reactions, in particular for the metathesis of nitrile rubber.

BACKGROUND OF THE INVENTION

Metathesis reactions are used widely in chemical syntheses, e.g. in the form of ring-closing metatheses (RCM), cross metatheses (CM), ring-opening metatheses (ROM), ring-opening metathesis polymerizations (ROMP), cyclic diene metathesis polymerizations (ADMET), self-metathesis, reaction of alkenes with alkynes (enyne reactions), polymerization of alkynes and olefinization of carbonyls (WO-A-97/06185 und Platinum Metals Rev., 2005, 49(3), 123-137). Metathesis reactions are employed, for example, for the synthesis of olefins, for ring-opening polymerization of norbornene derivatives, for the depolymerisation of unsaturated polymers and for the synthesis of telechelic polymers.

Metathesis catalysts are known, inter alia, from WO-A-96/04289 and WO-A-97/06185. They have the following in-principle structure:

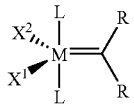

where M is osmium or ruthenium, the radicals R are identical or different organic radicals having a great structural variety, $X^1$ and $X^2$ are anionic ligands and the ligands L are uncharged electron-donors. In the literature, the term "anionic ligands" in the context of such metathesis catalysts always refers to ligands which, when they are viewed separately from the metal centre, are negatively charged for a closed electron shell.

Recently, metathesis reactions have become increasingly important for the degradation of nitrile rubbers.

For the purposes of the present invention, a nitrile rubber, referred to as "NBR" for short, is a nitrile rubber which is a copolymer or terpolymer of at least one α,β-unsaturated nitrile, at least one conjugated diene and, if appropriate, one or more further copolymerizable monomers.

Hydrogenated nitrile rubber, referred to as "HNBR" for short, is produced by hydrogenation of nitrile rubber. Accordingly, the C=C double bonds of the copolymerized diene units in HNBR are completely or partly hydrogenated. The degree of hydrogenation of the copolymerized diene units is usually in the range from 50 to 100%.

Hydrogenated nitrile rubber is a specialty rubber which displays very good heat resistance, excellent resistance to ozone and chemicals and excellent oil resistance.

The abovementioned physical and chemical properties of HNBR are combined with very good mechanical properties, in particular a high abrasion resistance. For this reason, HNBR has found widespread use in a wide variety of applications. HNBR is used, for example, for seals, hoses, belts and damping elements in the automobile sector, also for stators, oil well seals and valve seals in the field of crude oil production and also for numerous parts in the aircraft industry, the electronics industry, machine construction and shipbuilding.

HNBR grades which are commercially available on the market usually have a Mooney viscosity (ML 1+4 at 100° C.) in the range from 55 to 120, which corresponds to a number average molecular weight $M_n$ (determination method: gel permeation chromatography (GPC) against polystyrene standards) in the range from about 200000 to 700000. The polydispersity indices PDI measured (PDI=$M_w/M_n$, where $M_w$ is the weight average molecular weight and $M_n$ is the number average molecular weight), which give information about the width of the molecular weight distribution, are frequently 3 or above. The residual double bond content is usually in the range from 1 to 18% (determined by means of IR spectroscopy).

The processability of HNBR is subject to severe restrictions because of the relatively high Mooney viscosity. For many applications an HNBR grade which has a lower molecular weight and thus a lower Mooney viscosity would be desirable. This would significantly improve the processability.

Numerous attempts have been made in the past to shorten the chain length of HNBR by degradation. For example, a decrease in the molecular weight can be achieved by thermomechanical treatment (mastication), e.g. on a roll mill or in a screw apparatus (EP-A-0 419 952). However, this thermomechanical degradation has the disadvantage that function groups such as hydroxyl, keto, carboxylic acid and carboxylic ester groups are introduced into the molecule by partial oxidation and, in addition, the microstructure of the polymer is altered substantially.

For a long time, it has not been possible to produce HNBR having a low molar mass corresponding to a Mooney viscosity (ML 1+4 at 100° C.) in the range below 55 or a number average molecular weight of about $M_n$<200000 g/mol by means of established production processes since, firstly, a step increase in the Mooney viscosity occurs in the hydrogenation of NBR and secondly the molar mass of the NBR feedstock to be used for the hydrogenation cannot be reduced at will since otherwise work-up in the industrial plants available is no longer possible because the rubber is too sticky. The lowest Mooney viscosity of an NBR feedstock which can be worked up without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.). The Mooney viscosity is determined in accordance with ASTM standard D 1646.

In the more recent prior art, this problem is solved by reducing the molecular weight of the nitrile rubber before hydrogenation by degradation to a Mooney viscosity (ML 1+4 at 100° C.) of less than 30 Mooney units or a number average molecular weight of $M_n$<70000 g/mol. The reduction in the molecular weight is achieved by metathesis in which low molecular weight 1-olefins are usually added. The metathesis of nitrile rubber is described, for example, in WO-A-02/100905, WO-A-02/100941 and WO-A-03/002613. The metathesis reaction is advantageously carried out in the same solvent as the hydrogenation reaction so that the degraded nitrile rubber does not have to be isolated from the solvent after the degradation reaction is complete before it is subjected to the subsequent hydrogenation. The metathesis degradation reaction is catalyzed using metathesis catalysts which are tolerant to polar groups, in particular nitrile groups. WO-A-02/100905 and WO-A-02/100941 describe a process comprising the degradation of nitrile rubber starting polymers by olefin metathesis and subsequent hydrogenation to give HNBR having a low Mooney viscosity. Here, a nitrile rubber is reacted in the presence of a coolefin and specific complex catalysts based on osmium, ruthenium, molybdenum or tungsten in a first step and hydrogenated in a second step. In this way, it is possible to obtain hydrogenated nitrile rubbers having a weight average molecular weight ($M_w$) in the range from 30000 to 250000, a Mooney viscosity (ML 1+4 at 100° C.) in the range from 3 to 50 and a polydispersity index PDI of less than 2.5.

The metathesis of nitrile rubber can, for example, be carried using the catalyst bis(tricyclohexylphosphine)benzylideneruthenium dichloride shown below.

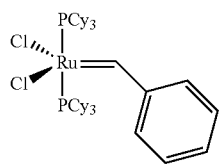

Grubbs (I) Catalyst

As a result of metathesis and hydrogenation, the nitrile rubbers have a lower molecular weight and a narrower molecular weight distribution than the hydrogenated nitrile rubbers which have hitherto been able to be produced according to the prior art.

However, the amounts of Grubbs (I) catalyst employed for carrying out the metathesis are large. In the experiments in WO-A-03/002613, they are for example, 307 ppm and 61 ppm of Ru based on the nitrile rubber used. The reaction times necessary are also long and the molecular weights after degradation are still relatively high (see Example 3 of WO-A-03/002613 where $M_w$=180000 g/mol and $M_n$=71000 g/mol).

US 2004/0127647 A1 describes blends based on low molecular weight HNBR rubbers having a bimodal or multimodal molecular weight distribution and also vulcanizates of these rubbers. According to the examples, 0.5 phr of Grubbs (I) catalyst is used for carrying out the metathesis. This corresponds to the large amount of 614 ppm of ruthenium based on the nitrile rubber used. Furthermore, a group of catalysts referred to by those skilled in the art as "Grubbs (II) catalysts" is known from WO-A-00/71554.

If a "Grubbs (II) catalyst" of this type, e.g. the catalyst 1,3-bis(2,4,6-trimethylphenyl)-2-imidazolidenylidene)(tricyclohexylphosphine)(phenylmethylene)ruthenium dichloride shown below, is used for the metathesis of NBR (US-A-2004/0132891), this is successful even without use of a coolefin.

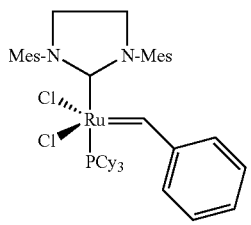

Grubbs (II) Catalyst

After the subsequent hydrogenation, which is preferably carried out in the same solvent, the hydrogenated nitrile rubber has lower molecular weights and a narrower molecular weight distribution (PDI) than when catalysts of the Grubbs (I) type are used. In terms of the molecular weight and the molecular weight distribution, the metathetic degradation using catalysts of the Grubbs (II) type proceeds more efficiently than when catalysts of the Grubbs (I) type are used. However, the amounts of ruthenium necessary for this efficient metathetic degradation are still relatively high. Even when the metathesis is carried out using the Grubbs (II) catalyst, long reaction times are still required.

In all the abovementioned processes for the metathetic degradation of nitrile rubber, relatively large amounts of catalyst have to be used and long reaction times are required to produce the desired low molecular weight nitrile rubbers by means of metathesis.

Even in other types of metathesis reactions, the activity of the catalysts used is of critical importance.

In J. Am. Chem. Soc. 1997, 119, 3887-3897, it is stated that in the ring-closing metathesis of diethyl diallylmalonate show below

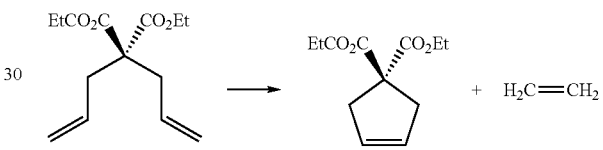

the activity of the catalysts of the Grubbs (I) type can be increased by additions of CuCl and $CuCl_2$. This increase in activity is explained by a shift in the dissociation equilibrium due to a phosphane ligand which leaves its coordination position being scavenged by copper ions to form copper-phosphane complexes.

However, this increase in activity brought about by copper salts in the abovementioned ring-closing metathesis cannot be applied at will to other types of metathesis reactions. Studies by the inventors have shown that, unexpectedly, although the addition of copper salts leads to an initial acceleration of the metathesis reaction in the metathetic degradation of nitrite rubbers, a significant worsening of the metathesis efficiency is observed. The molecular weights of the degraded nitrite rubbers which can be achieved in the end are substantially higher than when the metathesis reaction is carried out in the presence of the same catalyst but in the absence of the copper salts.

An as yet unpublished German patent application describes catalyst systems for metathesis in which one or more salts are used in addition to the actual metathesis catalyst. This combination of one or more salts with the metathesis catalysts leads to an increase in the activity of the catalyst. Many meanings which can be selected from various lists are in each case possible for the anions and cations of these salts. In the examples of this German patent application, the use of lithium bromide is found to be particularly advantageous both for the metathetic degradation of rubbers, e.g. nitrite rubbers, and for the ring-closing metathesis of diethyl diallylmalonate. Catalysts used here are the Grubbs (II) catalyst, the Hoveyda catalyst, the Buchmeiser-Nuyken catalyst and the Grela catalyst.

Owing to the corrosion-promoting action of bromide ions, the use of lithium bromide and also of caesium bromide is not advisable without restrictions for all metathesis reactions. In the production of low molecular weight hydrogenated nitrite rubbers, additional safety aspects, for example, play a role since after the metathetic degradation of the nitrile rubber a hydrogenation is carried out under superatmospheric pressure in steel reactors. Since water is introduced into the reaction mixture via the residual moisture content of the nitrile rubber, when the hydrogenation is carried out in the presence of lithium bromide it is necessary to ensure by means of additional measures that "pit corrosion" of the steel autoclave does not occur. For this reason, the use of bromide additions in the production of particularly low molecular weight nitrite rubbers is not an economically optimal procedure.

Furthermore, the examples of the abovementioned German patent application also make it obvious that the activity-increasing effect of lithium chloride is weaker than that of lithium bromide.

The increase in the activity of metathesis catalysts by means of salts was likewise examined in Inorganica Chimica Acta 359 (2006) 2910-2917. The influences of tin chloride, tin bromide, tin iodide, iron(II) chloride, iron(II) bromide, iron(III) chloride, cerium(III) chloride*7H$_2$O, ytterbium(H) chloride, antimony trichloride, gallium dichloride and aluminium trichloride on the self-metathesis of 1-octene to form 7-tetradecene and ethylene were studied. When the Grubbs (I) catalyst was used, a significant improvement in the conversion of 7-tetradecene was observed on addition of tin chloride or tin bromide (Table 1). Without the addition of a salt, a conversion of 25.8% was achieved, when SnCl$_2$*2H$_2$O was added the conversion rose to 68.5% and when tin bromide was added it rose to 71.9%. Addition of tin iodide significantly reduced the conversion from 25.8% to 4.1%. However, in combination with the Grubbs (II) catalyst, all three tin salts lead to only slight improvements in conversion from 76.3% (reference experiment without addition) to 78.1% (SnCl$_2$), to 79.5% (SnBr$_2$) and 77.6% (SnI$_2$). When the "Phobcats" [Ru(phobCy)$_2$Cl$_2$ (=ChPh)] is used, the conversion is reduced from 87.9% to 80.8% by addition of SnCl$_2$, to 81.6% by addition of SnBr$_2$ and to 73.9% by addition of SnI$_2$. When iron(II) salts are used in combination with the Grubbs (1) catalyst, the increase in conversion when iron(II) bromide is used is higher than when iron(II) chloride is used. It may be noted that regardless of the type of catalyst used, the conversion is always higher when bromides are used than when the corresponding chlorides are used.

However, the use of the tin bromide or iron(II) bromide described in Inorganica Chimica Acta 359 (2006) 2910-2917 is not an optimal solution for the preparation of nitrile rubbers because of the corrosive nature of the bromides, as described above.

In the preparation of hydrogenated nitrile rubbers, the solvent is usually removed by steam distillation after the hydrogenation. If tin salts are used as part of the catalyst system, certain amounts of these tin salts get into the wastewater which therefore has to be purified, which costs money. For this reason, the use of tin salts for increasing the activity of catalysts in the preparation of nitrile rubbers is not economically advisable.

The use of iron salts is restricted by the fact that they reduce the capacity of some ion-exchange resins which are usually used for recovering the noble metal compounds used in the hydrogenation. This likewise impairs the economics of the overall process.

Furthermore, ChemBioChem 2003, 4, 1229-1231, describes the synthesis of polymers by ring-opening metathesis polymerization (ROMP) of norbornyl oligopeptides in the presence of a ruthenium-carbene complex Cl$_2$(PCy$_3$)$_2$Ru=CHphenyl, with LiCl being added. The addition of LiCl is undertaken with the declared aim of avoiding aggregation and increasing the solubility of the growing polymer chains. Nothing is reported about an activity-increasing effect of the salt addition on the catalyst.

J. Org. Chem. 2003, 68, 202-2023, too, discloses carrying out a ring-opening polymerization of oligopeptide-substituted norbornenes, in which LiCl is added. Here too, the influence of LiCl as solubility-increasing additive for the peptides in nonpolar organic solvents is emphasized. For this reason, an increase in the degree of polymerization DP can be achieved by addition of LiCl.

In J. Am. Chem. Soc. 1997, 119, 3887-3897, it is stated that metathesis catalysts containing NHC ligands, e.g. the Grubbs (II) catalyst, are treated with LiBr or NaI to replace the chloride ligands of the Grubbs (II) catalyst by bromide or iodide.

In view of this prior art, it is, for process engineering reasons and for reasons of environmental protection, an object of the present invention to provide particularly suitable catalyst systems which can be used universally in the various types of metathesis reactions and, on the basis of a variety of metathesis catalysts, lead to increases in activity and thus allow a reduction in the amount of catalyst and therefore, in particular, the amount of noble metal present therein. It is an object to find, especially for the metathetic degradation of nitrile rubber, possibilities which enable the activity of the catalyst used to be increased without gelling of the nitrite rubber.

SUMMARY OF THE INVENTION

It has surprisingly been found that the activity of metathesis catalysts can be significantly increased when they are used in combination with alkaline earth metal chlorides. Such catalyst systems have been found to be superior to the systems previously known from and described in the prior art. Especially in the cross metathesis of nitrite rubber to achieve a decrease in the molecular weight, it is found that significantly narrower molecular weight distributions and lower molecular weights can be obtained and at the same time no gelling occurs.

DETAILED DESCRIPTION OF THE INVENTION

The invention accordingly provides a catalyst system comprising a metathesis catalyst which is a complex catalyst based on a metal of transition group 6 or 8 of the Periodic Table and has at least one ligand bound in a carbene-like fashion to the metal and at least one alkaline earth metal chloride.

For the purposes of the present patent application and invention, all general or preferred definitions of radicals, parameters or explanations mentioned above and in the following can be combined with one another, i.e. between the respective ranges and preferred ranges, in any desired way.

The term "substituted" used for the purposes of the present patent application in connection with the various types of metathesis catalysts means that a hydrogen atom on the radical or atom indicated has been replaced by one of the groups indicated in each case, with the proviso that the valency of the indicated atom is not exceeded and the substitution leads to a stable compound.

The metathesis catalysts to be used according to the invention are complex catalysts based on a metal of transition group 6 or 8 of the Periodic Table. These complex catalysts have the common structural feature that they have at least one ligand which is bound in a carbene-like fashion to the metal. In a preferred embodiment, the complex catalyst has two carbene ligands, i.e. two ligands which are bound in a carbene-like fashion to the central metal of the complex. As metals of transition groups 6 and 8 of the Periodic Table, preference is given to molybdenum, tungsten, osmium and ruthenium.

Suitable catalyst systems according to the invention are, for example, systems which comprise catalysts of the general formula (A),

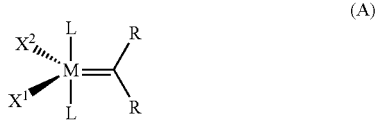

(A)

where

M is osmium or ruthenium, $X^1$ and $X^2$ are identical or different and are two ligands, preferably anionic ligands, the symbols L represent identical or different ligands, preferably uncharged electron donors, the radicals R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these radicals may in each case optionally be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms.

These catalyst systems preferably comprise calcium chloride or magnesium chloride in addition to a catalyst of the general formula (A).

In preferred catalysts of the general formula (A), one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals.

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals, too, may once again be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), the symbols L represent identical or different ligands and are preferably uncharged electron donors.

The two ligands L can, for example, be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_{10}$-alkylphosphine or $C_3$-$C_{20}$-cycloalkylphosphine ligand, a sulphonated $C_6$-$C_{24}$-arylphosphine or sulphonated $C_1$-$C_{10}$-alkylphosphine ligand, a $C_6$-$C_{24}$-arylphosphinite or $C_1$-$C_{10}$-alkylphosphinite ligand, a $C_6$-$C_{24}$-arylphosphonite or $C_1$-$C_{10}$-alkylphosphonite ligand, a $C_6$-$C_{24}$-aryl phosphite or $C_1$-$C_{10}$-alkyl phosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen-, $C_1$-$C_5$-alkyl or $C_1$-$C_5$-alkoxy radical.

The term "phosphine" includes, for example, $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$.

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulphonate" includes, for example, trifluoromethanesulphonate, tosylate and mesylate.

The term "sulphoxide" includes, for example, $CH_3S(=O)CH_3$ and $(C_6H_5)_2SO$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned by, for example, Grubbs in WO-A-03/011455. Examples are: pyridine, picolines (α-, β- and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If one or both of the ligands L is an imidazolidine radical (Im), this usually has a structure corresponding to the general formulae (IIa) or (IIb),

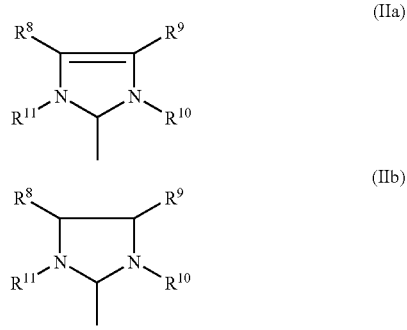

where
$R^8, R^9, R^{10}, R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

If appropriate, one or more of the radicals $R^8, R^9, R^{10}, R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted one or more radicals, preferably radicals selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazolidine radical depicted in the general formulae (IIa) and (IIb) in the present patent application are equivalent to the structures (IIa') and (IIb') which are frequently also found in the literature for this imidazolidine radical (Im) and emphasize the carbene character of the imidazolidine radical This applies analogously to the associated preferred structures (IIIa)-(IIIf) depicted below.

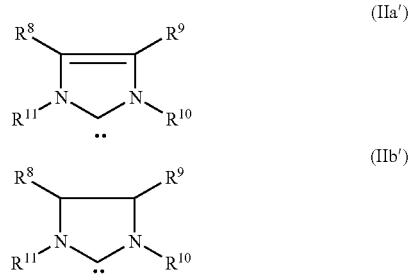

In a preferred embodiment of the catalysts of the general formula (A), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals as meanings of $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl, mesityl or 2,6-diisopropylphenyl.

Particularly preferred imidazolidine radicals (Im) have the following structures (IIIa) to (IIIf), where Mes is in each case 2,4,6-trimethylphenyl or alternatively in all cases 2,6-diisopropylphenyl.

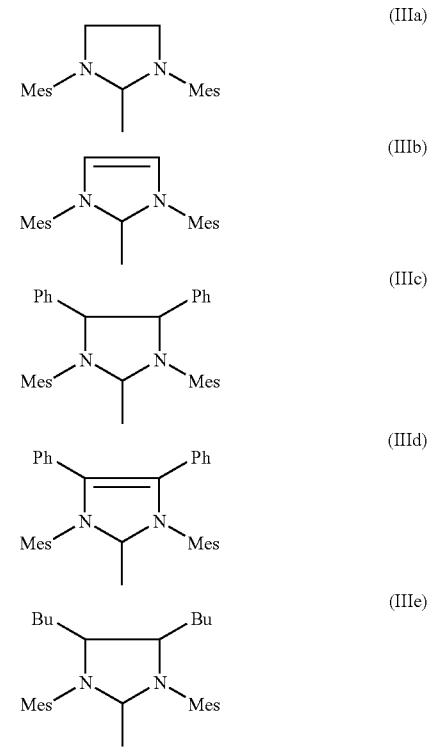

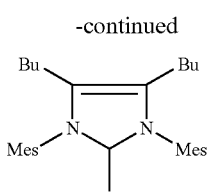

(IIIf)

Various representatives of the catalysts of the formula (A) are known in principle, e.g. from WO-A-96/04289 and WO-A-97/06185.

As an alternative to the preferred Im radicals, one or both ligands L in the general formula (A) are also preferably identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one or both ligands L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Particular preference is given to catalyst systems comprising one of the two catalysts below, which come under the general formula (A) and have the structures (IV) (Grubbs (I) catalyst) and (V) (Grubbs (II) catalyst), where Cy is cyclohexyl.

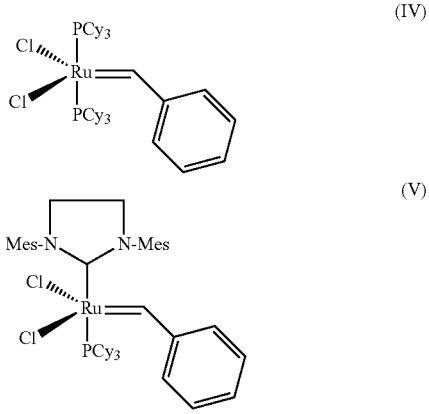

(IV)

(V)

In a further embodiment, use is made of catalysts of the general formula (A1),

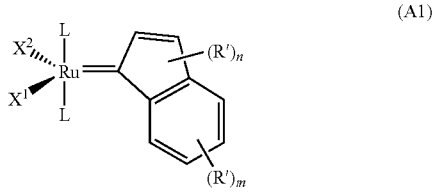

(A1)

where
$X^1$, $X^2$ and L can have the same general, preferred and particularly preferred meanings as in the general formula (A),
n is 0, 1 or 2,
m is 0, 1, 2, 3 or 4 and the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may in each case be substituted by one or more alkyl, halogen, alkoxy, aryl or heteroaryl radicals.

As preferred catalyst coming under the general formula (A1), it is possible to use, for example, the catalyst of the formula (VI) below, where Mes is in each case 2,4,6-trimethylphenyl and Ph is phenyl.

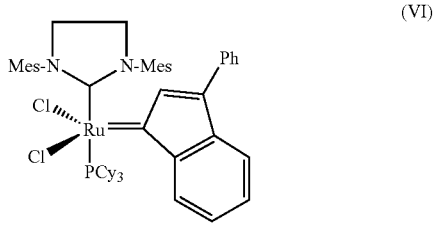

(VI)

This catalyst which is also referred to in the literature as "Nolan catalyst" is known, for example, from WO-A-2004/112951.

The particularly preferred catalyst systems according to the invention comprise, in particular, calcium chloride or magnesium chloride in addition to the catalysts of the formula (IV), (V) or (VI).

Further suitable catalyst systems according to the invention are also systems which comprise the catalysts of the general formula (B),

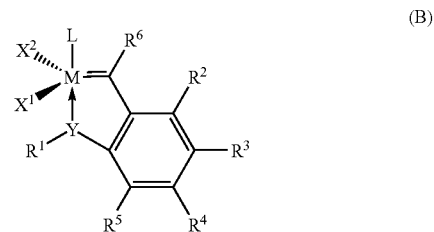

(B)

where
M is ruthenium or osmium,
$X^1$ and $X^2$ are identical or different ligands, preferably anionic ligands,
Y is oxygen (O), sulphur (S), an N—$R^1$ radical or a P—$R^1$ radical, where $R^1$ is as defined below,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical,
$R^6$ is hydrogen or an alkyl, alkenyl, alkynyl or aryl radical and L is a ligand which has the same meanings as in formula (A).

These catalyst systems preferably comprise calcium chloride or magnesium chloride in addition to the catalyst of the general formula (B).

The catalysts of the general formula (B) are known in principle. Representatives of this class of compounds are the catalysts described by Hoveyda et al. in US 2002/0107138A1 and Angew Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and also in J. Org. Chem. 2004, 69, 6894-96 and Chem. Eur. J 2004, 10, 777-784. The catalysts are commercially available or can be prepared as described in the literature references cited.

In the catalysts of the general formula (B), L is a ligand which usually possesses an electron donor function and can have the same general, preferred and particularly preferred meanings as L in the general formula (A).

Furthermore, L in the general formula (B) is preferably a $P(R^7)_3$ radical, where the radicals $R^7$ are each, independently of one another, $C_1$-$C_6$-alkyl, $C_3$-$C_8$-cycloalkyl or aryl, or else a substituted or unsubstituted imidazolidine radical ("Im").

$C_1$-$C_6$-alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-cycloalkyl encompasses cyclopropyl, cyclobutyl, cyclopentyl, cyclohexyl, cycloheptyl and cyclooctyl.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The imidazolidine radical (Im) usually has a structure of the general formula (IIa) or (IIb),

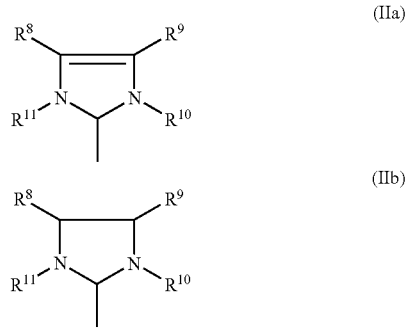

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

If appropriate, one or more of the radicals $R^8$, $R^9$, $R^{10}$, $R^{11}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

In a preferred embodiment of the catalyst system according to the invention, use is made of catalysts of the general formula (B) in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radial, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a further preferred embodiment of the catalyst system according to the invention, use is made of catalysts of the general formula (B) in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, or $C_6$-$C_{10}$-arylsulphonate, particularly preferably p-toluenesulphonate.

The abovementioned radicals as meanings of $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl or mesityl.

Particularly preferred imidazolidine radicals (Im) have the structures (IIIa-IIIf) mentioned above, where Mes is in each case 2,4,6-trimethylphenyl.

In the catalysts of the general formula (B), $X^1$ and $X^2$ are identical or different and can each be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthio, $C_6$-$C_{24}$-arylthio, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where the latter radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical which may in each case optionally be substituted by one or more alkyl, halogen, alkoxy, aryl or heteroaryl radicals.

$R^1$ is preferably a $C_3$-$C_{20}$-cylcoalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

$C_3$-$C_{20}$-cycloalkyl radicals encompass, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may be in each case optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cylcoalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (B), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Further suitable catalyst systems are ones which comprise catalysts of the general formula (B1),

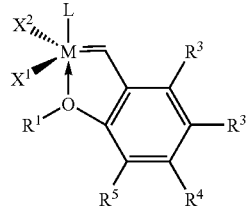

(B1)

where
M, L, $X^1$, $X^2$, $R^1$, $R^2$, $R^3$, $R^4$ and $R^5$ can have the general, preferred and particularly preferred meanings mentioned for the general formula (B).

These catalyst systems preferably comprise calcium chloride or magnesium chloride in addition to the catalyst of the general formula (B1).

The catalysts of the general formula (B1) are known in principle from, for example, US 2002/0107138 A1 (Hoveyda et al.) and can be obtained by preparative methods indicated there.

Particular preference is given to catalyst systems comprising catalysts of the general formula (B1) in which
M is ruthenium,
$X^1$ and $X^2$ are both halogen, in particular both chlorine,
$R^1$ is a straight-chain or branched $C_{1-12}$-alkyl radical,
$R^2$, $R^3$, $R^4$, $R^5$ have the general and preferred meanings mentioned for the general formula (B) and
L has the general and preferred meanings mentioned for the general formula (B).

Especial preference is given to catalyst systems comprising catalysts of the general formula (B1) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

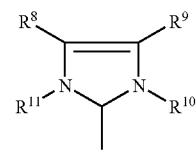

(IIa)

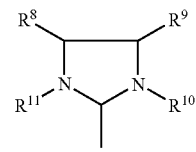

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl, where the abovementioned radicals may in each case be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, and these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Very particular preference is given to a catalyst system comprising calcium chloride or magnesium chloride and a catalyst which comes under the general structural formula (B1) and has the formula (VII), where Mes is in each case 2,4,6-trimethylphenyl.

(VII)

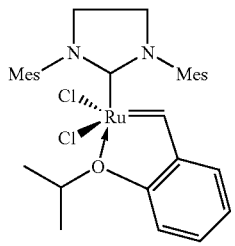

This catalyst (VII) is also referred to as "Hoveyda catalyst" in the literature.

Further suitable catalyst systems are those which comprise calcium chloride or magnesium chloride and a catalyst which comes under the general structural formula (B1) and has one of the formulae (VIII), (IX), (X), (XI), (XII), (XIII), (XIV) and (XV) below, where Mes is in each case 2,4,6-trimethylphenyl.

(VIII)

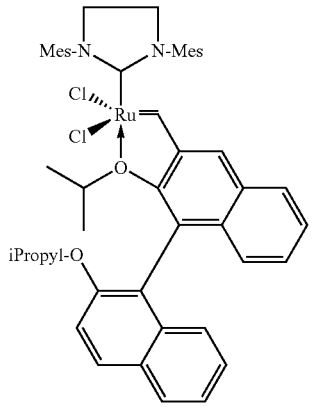

(IX)

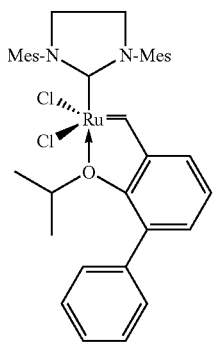

-continued (X)

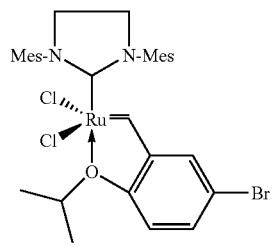

(XI)

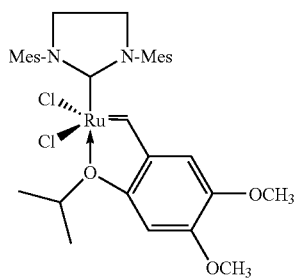

(XII)

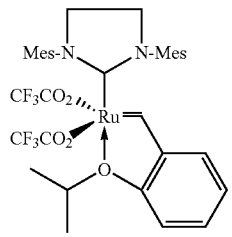

(XIII)

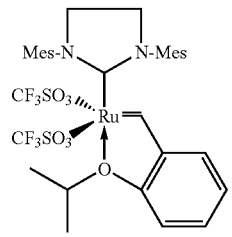

(XIV)

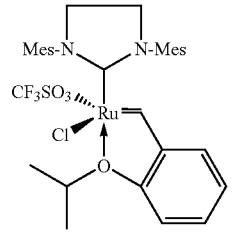

(XV)

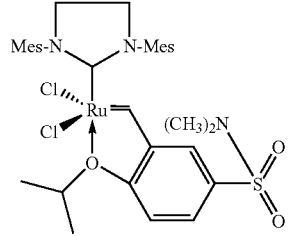

A further catalyst system according to the invention comprises a catalyst of the general formula (B2).

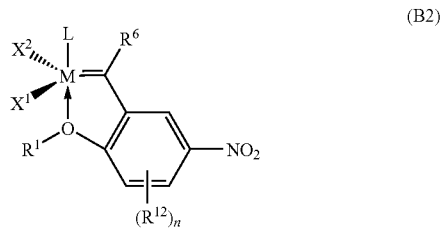
(B2)

where
M, L, X¹, X², R¹ and R⁶ have the general and preferred meanings mentioned for the formula (B),
the radicals R¹² are identical or different and have the general and preferred meanings, with the exception of hydrogen, mentioned for the radicals R², R³, R⁴ and R⁵ in the formula (B) and
n is 0, 1, 2 or 3.

These catalyst systems preferably comprise calcium chloride or magnesium chloride in addition to the catalyst of the general formula (B2).

The catalysts of the general formula (B2) are known in principle from, for example, WO-A-2004/035596 (Grela) and can be obtained by preparative methods indicated there.

Particular preference is given to catalyst systems comprising a catalyst of the general formula (B2) in which
M is ruthenium,
X¹ and X² are both halogen, in particular both chlorine,
R¹ is a straight-chain or branched $C_1$-$C_{12}$-alkyl radical,
R¹² has the meanings mentioned for the general formula (B2),
n is 0, 1, 2 or 3,
R⁶ is hydrogen and
L has the meanings mentioned for the general formula (B).

Very particular preference is given to catalyst systems comprising a catalyst of the general formula (B2) in which
M is ruthenium,
X¹ and X² are both chlorine,
R¹ is an isopropyl radical,
n is 0 and
L is a substituted or unsubstituted imidazolidine radical of the formulae (IIa) or (IIb), where R⁸, R⁹, R¹⁰, R¹¹ are identical or different and have the meanings mentioned for the very particularly preferred catalysts of the general formula (B1).

A particularly useful catalyst system comprises calcium chloride and magnesium chloride and also a catalyst which comes under the general formula (B2) and has the structure (XVI).

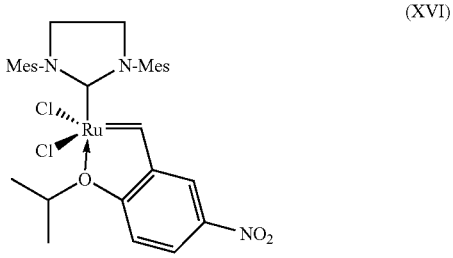
(XVI)

The catalyst (XVI) is also referred to as "Grela catalyst" in the literature.

A further suitable catalyst system comprises calcium chloride or magnesium chloride and a catalyst which comes under the general formula (B2) and has the structure (XVII), where Mes is in each case 2,4,6-trimethylphenyl.

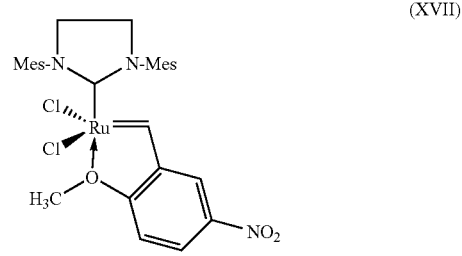
(XVII)

An alternative embodiment provides catalyst systems comprising a catalyst of the general formula (B3) having a dendritic structure,

(B3)

where D¹, D², D³ and D⁴ each have a structure of the general formula (XVIII) shown below which is bound via the methylene group shown at right to the silicon of the formula (B3),

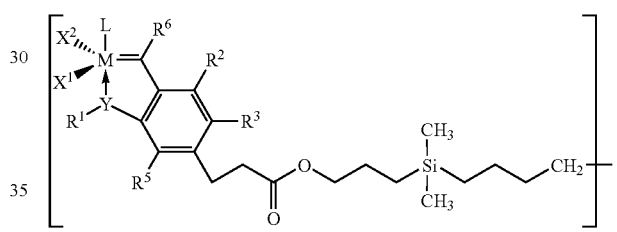
(XVIII)

where
M, L, X¹, X², R¹, R², R³, R⁵ and R⁶ can have the general and preferred meanings mentioned for the general formula (B).

These catalyst systems preferably comprise calcium chloride or magnesium chloride in addition to the catalyst of the general formula (B3).

The catalysts of the general formula (B3) are known from US 2002/0107138 A1 and can be prepared as described there.

A further alternative embodiment provides a catalyst system comprising calcium chloride or magnesium chloride and a catalyst of the formula (B4),

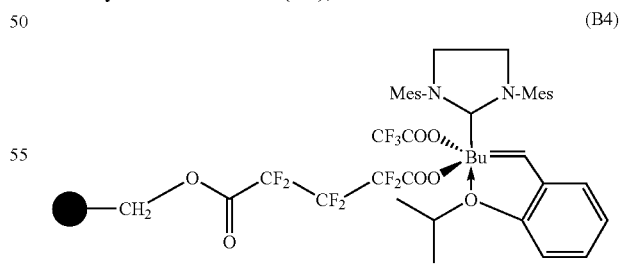
(B4)

where the symbol ● represents a support.

The support is preferably a poly(styrene-divinylbenzene) copolymer (PS-DVB).

The catalysts of the formula (B4) are known in principle from Chem. Eur. J. 2004 10, 777-784 and can be obtained by the preparative methods described there.

All the abovementioned catalysts of type (B) can either be used as such in the reaction mixture of the NBR metathesis or can be applied to and immobilized on a solid support. Suitable solid phases or supports are materials which firstly are inert towards the reaction mixture of the metathesis and secondly do not adversely affect the activity of the catalyst. To immobilize the catalyst, it is possible to use, for example, metals, glass, polymers, ceramic, organic polymer spheres or inorganic sol-gels, carbon black, silicates, silicates, calcium carbonate and barium sulphate.

A further embodiment provides catalyst systems comprising a catalyst of the general formula (C),

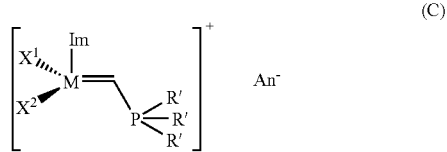
(C)

where

M is ruthenium or osmium, $X^1$ and $X^2$ are identical or different and are anionic ligands, the radicals R' are identical or different and are organic radicals, Im is a substituted or unsubstituted imidazolidine radical and An is an anion.

These catalyst systems preferably comprise calcium chloride or magnesium chloride in addition to the catalyst of the general formula (C).

The catalysts of the general formula (C) are known in principle (see, for example, Angew. Chem. Int. Ed. 2004, 43, 6161-6165).

$X^1$ and $X^2$ in the general formula (C) can have the same general, preferred and particularly preferred meanings as in the formulae (A) and (B).

The imidazolidine radical (Im) usually has a structure of the general formula (IIa) or (IIb) which have been mentioned above for the catalyst type of the formulae (A) and (B) and can have all the structures mentioned there as preferred, in particular those of the formulae (IIIa)-(IIIf).

The radicals R' in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

Preference is given to the radicals R' in the general formula (C) being identical and each being phenyl, cyclohexyl, cyclopentyl, isopropyl, o-tolyl, o-xylyl or mesityl.

A further alternative embodiment provides a catalyst system comprising a catalyst of the general formula (D)

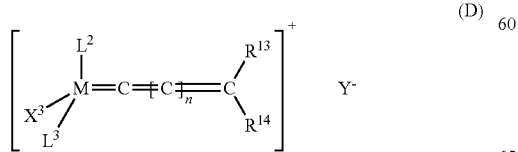
(D)

where

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged p-bonded ligand which may either be monocyclic or polycyclic, $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, $Y^-$ is a noncoordinating anion and n is 0, 1, 2, 3, 4 or 5.

These catalyst systems preferably comprise calcium chloride or magnesium chloride in addition to the catalyst of the general formula (D).

A further embodiment provides a catalyst system comprising a catalyst of the general formula (E),

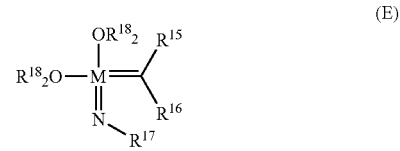
(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_2$-alkylsulphinyl, $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

These catalyst systems preferably comprise calcium chloride or magnesium chloride in addition to the catalyst of the general formula (E).

A further alternative embodiment provides a catalyst system comprising a catalyst of the general formula (F),

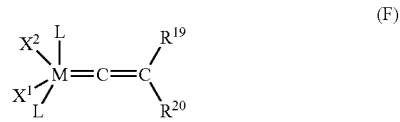
(F)

where

M is ruthenium or osmium, $X^1$ and $X^2$ are identical or different and are anionic ligands which can have all meanings of $X^1$ and $X^2$ mentioned in the general formulae (A) and (B), the symbols L represent identical or different ligands which can have all general and preferred meanings of L mentioned in the general formulae (A) and (B), $R^{19}$ and $R^{10}$ are identical or different and are each hydrogen or substituted or unsubstituted alkyl.

These catalyst systems preferably comprise calcium chloride or magnesium chloride in addition to the catalyst of the general formula (F).

A further alternative embodiment provides a catalyst system according to the invention comprising a catalyst of the general formula (G), (H) or (K),

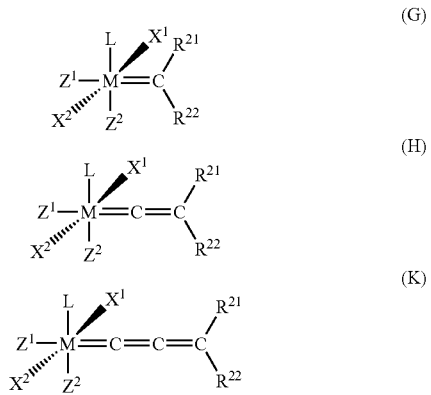

where

M is osmium or ruthenium, $X^1$ and $X^2$ are identical or different and are two ligands, preferably anionic ligands, L is a ligand, preferably an uncharged electron donor, $Z^1$ and $Z^2$ are identical or different and are uncharged electron donors, $R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which are in each case substituted by one or more radicals selected from among alkyl, halogen, alkoxy, aryl or heteroaryl.

The catalysts of the general formulae (G), (H) and (K) are known in principle, e.g. from WO 2003/011455 A1, WO 2003/087167 A2, Organometallics 2001, 20, 5314 and Angew. Chem. Int. Ed. 2002, 41, 4038. The catalysts are commercially available or can be synthesized by the preparative methods indicated in the abovementioned literature references.

$Z^1$ and $Z^2$

In the catalyst systems which can be used according to the invention, catalysts of the general formulae (G), (H) and (K) in which $Z^1$ and $Z^2$ are identical or different and are uncharged electron donors are used. These ligands are usually weakly coordinating. The ligands are typically optionally substituted heterocyclic groups. These can be five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more groups, preferably groups selected from the group consisting of halogen, in particular chlorine or bromine, $C_1$-$C_5$-alkyl, $C_1$-$C_5$-alkoxy and phenyl. Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolidines and pyrroles.

$Z^1$ and $Z^2$ can also be bridged to one another to form a cyclic structure. In this case, $Z^1$ and $Z^2$ form a single bidentate ligand.

L

In the catalysts of the general formulae (G), (H) and (K), L can have the same general, preferred and particularly preferred meanings as L in the general formula (A) and (B).

$R^{21}$ and $R^{22}$

In the catalysts of the general formulae (G), (H) and (K), $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_1$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where the abovementioned substituents may be substituted by one or more alkyl, halogen, alkoxy, aryl or heteroaryl radicals.

$X^1$ and $X^2$

In the catalysts of the general formulae (G), (H) and (K), $X^1$ and $X^2$ are identical or different and can have the same general, preferred and particularly preferred meanings as indicated above for $X^1$ and $X^2$ in the general formula (A).

Preference is given to using catalysts of the general formulae (G), (H) and (K) in which M is ruthenium, $X^1$ and $X^2$ are both halogen, in particular chlorine, $R^1$ and $R^2$ are identical or different and are five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals, $R^{21}$ and $R^{22}$ are identical or different and are each $C_1$-$C_{30}$-alkyl $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, and L has a structure of the above-described general formula (IIa) or (IIb), in particular one of the formulae (IIIa) to (IIIf).

A particularly preferred catalyst which comes under the general formula (G) has the structure (XIX),

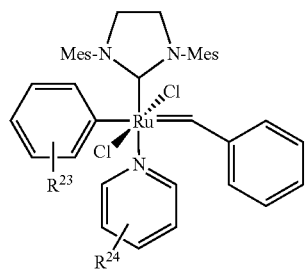
(XIX)

where $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned radicals $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may in turn each be substituted by one or more halogen, preferably fluorine, chlorine or bromine, $C_1$-$C_5$-alkyl, $C_1$-$C_5$-alkoxy or phenyl radicals.

Particularly preferred embodiments of the catalyst of the formula (XIX) have the structure (XIX a) or (XIX b), where $R^{23}$ and $R^{24}$ have the same meanings as indicated in the formula (XIX).

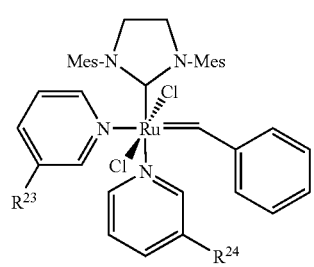
(XIXa)

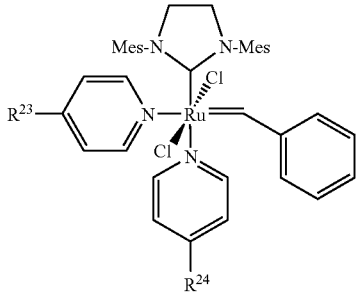
(XIXb)

When $R^{23}$ and $R^{24}$ are each hydrogen, the catalyst is referred to in the literature as the "Grubbs III catalyst".

Further suitable catalysts which come under the general formulae (G), (H) and (K) have the following structural formulae (XX)-(XXXI), where Mes is in each case 2,4,6-trimethylphenyl.

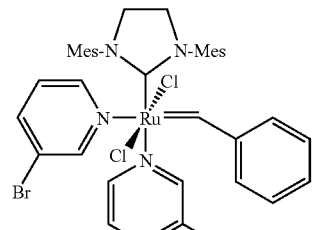
(XX)

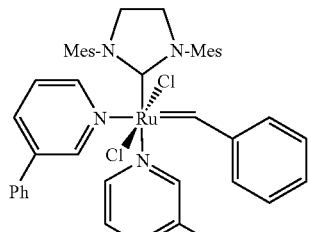
(XXI)

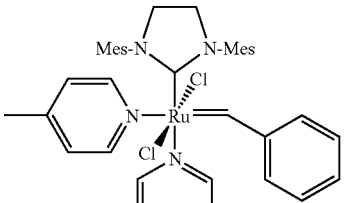
(XXII)

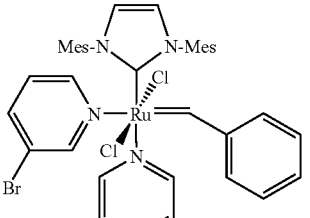
(XXIII)

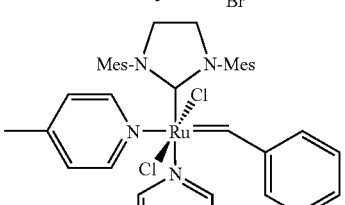
(XXIV)

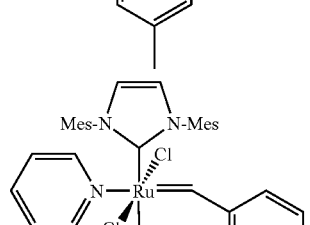
(XXV)

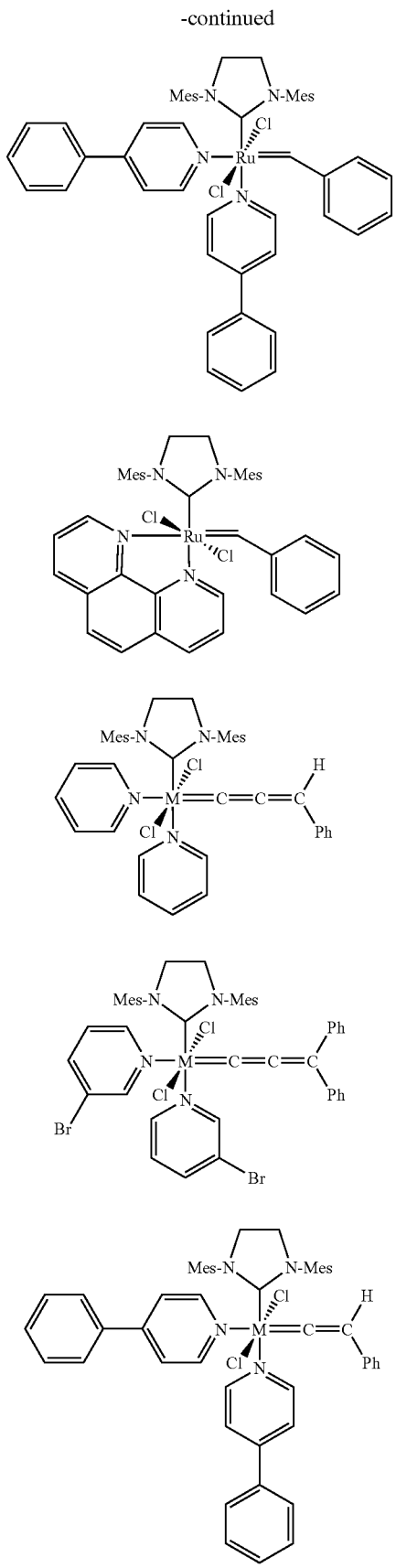

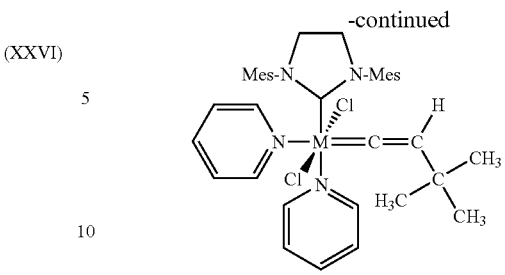

The invention further provides for the use of the catalyst systems according to the invention in metathesis reactions.

The metathesis reactions can be, for example, ring-closing metatheses (RCM), cross metatheses (CM) or ring-opening metatheses (ROMP).

In the catalyst system according to the invention, the metathesis catalyst and the alkaline earth metal chloride are used in a weight ratio of alkaline earth metal chloride:metathesis catalyst of from 0.01:1 to 10000:1, preferably from 0.1:1 to 1000:1, particularly preferably from 0.5:1 to 500:1.

The alkaline earth metal chloride can be added in a dispersion medium or without a dispersion medium to the metathesis catalyst or its solution in order to obtain the catalyst system according to the invention.

As dispersion medium in which the alkaline earth metal chloride is added to the catalyst or its solution, it is possible to use all known solvents. For the addition of alkaline earth metal chloride to be effective, it is not necessary for the alkaline earth metal chloride to have a solubility in the dispersion medium. Preferred dispersion media encompass, but are not restricted to, acetone, benzene, chlorobenzene, chloroform, cyclohexane, dichloromethane, dioxane, dimethylformamide, dimethylacetamide, dimethyl sulphone, dimethyl sulphoxide, methyl ethyl ketone, tetrahydrofuran, tetrahydropyran and toluene. The dispersion medium is preferably inert towards the metathesis catalyst.

The catalyst systems according to the invention are preferably used for the metathesis of nitrile rubber. The use according to the invention is then a process for reducing the molecular weight of nitrile rubber by bringing the nitrile rubber into contact with the catalyst system according to the invention. This reaction is a cross metathesis.

When the catalyst systems according to the invention are used for the metathesis of nitrile rubber, the amount in which the alkaline earth metal chloride is used is, based on the rubber to be degraded, in the range from 0.0001 phr to 50 phr, preferably from 0.001 phr to 35 phr (phr+parts by weight per 100 parts by weight of rubber).

For use in the metathesis of NBR, the alkaline earth metal chloride can also be added in a dispersant or without a dispersant to a solution of the metathesis catalyst. As an alternative, the alkaline earth metal chloride can also be added directly to a solution of the nitrile rubber to be degraded to which the metathesis catalyst is then also added so that the entire catalyst system according to the invention is present in the reaction mixture.

The amount of metathesis catalyst based on the nitrile rubber used depends on the nature and the catalytic activity of the specific catalyst. The amount of catalyst used is usually from 1 to 1000 ppm of noble metal, preferably from 2 to 500 ppm, in particular from 5 to 250 ppm, based on the nitrile rubber used.

The NBR metathesis can be carried out in the absence or in the presence of a coolefin. This is preferably a straight-chain or branched $C_2$-$C_{16}$-olefin. Suitable olefins are, for example, ethylene, propylene, isobutene, styrene, 1-hexene and 1-octene. Preference is given to using 1-hexene or 1-octene. If the coolefin is liquid (for example as in the case of 1-hexene), the amount of coolefin is preferably in the range 0.2-20% by weight based on the NBR used. If the coolefin is a gas, for example as in the case of ethylene, the amount of coolefin is preferably selected so that a pressure in the range $1\times10^5$ Pa-$1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not adversely affect the reaction in any other way. Preferred solvents encompass, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some case, when the coolefin itself can act as solvent, e.g. in the case of 1-hexene, the addition of a further additional solvent can also be dispensed with.

The concentration of the nitrile rubber used in the reaction mixture of the metathesis is not critical, but it naturally has to be noted that the reaction should not be adversely affected by an excessively high viscosity of the reaction mixture and the mixing problems associated therewith. The concentration of the NBR in the reaction mixture is preferably in the range from 1 to 25% by weight, particularly preferably in the range from 5 to 20% by weight, based on the total reaction mixture.

The metathetic degradation is usually carried out at a temperature in the range from 10° C. to 150° C., preferably at a temperature in the range from 20 to 100° C. The reaction time depends on a number of factors, for example on the type of NBR, on the type of catalyst, on the catalyst concentration employed and on the reaction temperature. The reaction is typically complete within five hours under normal conditions. The progress of the metathesis can be monitored by standard analytical methods, e.g. by GPC measurements or by determination of the viscosity.

As nitrile rubbers ("NBR"), it is possible to use copolymers or terpolymers which contain repeating units of at least one conjugated diene, at least one α,β-unsaturated nitrite and, if appropriate, one or more further copolymerizable monomers in the metathesis reaction.

The conjugated diene can be of any nature. Preference is given to using ($C_4$-$C_6$)-conjugated dienes. Particular preference is given to 1,3-butadiene, isoprene, 2,3-dimethylbutadiene, piperylene or mixtures thereof. In particular, use is preferably made of 1,3-butadiene or isoprene or mixtures thereof. Very particular preference is given to 1,3-butadiene.

As α,β-unsaturated nitrite, it is possible to use any known α,β-unsaturated nitrite, with preference being given to ($C_3$-$C_5$)-α,β-unsaturated nitrites such as acrylonitrile, methacrylonitrile, ethacrylonitrile or mixtures thereof. Particularly preference is given to acrylonitrile.

A particularly preferred nitrile rubber is thus a copolymer of acrylonitrile and 1,3-butadiene.

In addition to the conjugated diene and the α,β-unsaturated nitrite, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of the α,β-unsaturated nitrile or the sum of the α,β-unsaturated nitrites is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitrites are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the literature.

Nitrite rubbers which can be used for the purposes of the invention are also commercially available, e.g. as products from the product range of the grades Perbunan® and Krynac® of Lanxess Deutschland GmbH.

The nitrile rubbers used for the metathesis have a Mooney viscosity (ML 1+4 at 100° C.) in the range from 30 to 70, preferably from 30 to 50. This corresponds to a weight average molecular weight $M_w$ in the range 150000-500000, preferably in the range 180000-400000. Furthermore, the nitrile rubbers used have a polydispersity PDI=$M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

The nitrite rubbers obtained by the metathesis process of the invention have a Mooney viscosity (ML 1+4 at 100° C.) in the range 5-30, preferably in the range 5-20. This corresponds to a weight average molecular weight $M_w$ in the range 10000-100000, preferably in the range 10000-80000. Furthermore, the nitrite rubbers obtained have a polydispersity PDI=$M_w/M_n$, where $M_n$ is the number average molecular weight, in the range 1.4-4.0, preferably in the range 1.5-3.0.

The metathetic degradation in the presence of the catalyst system according to the invention can be followed by a hydrogenation of the degraded nitrite rubbers obtained. This can be carried out in the manner known to those skilled in the art.

The hydrogenation can be carried out using homogeneous or heterogeneous hydrogenation catalysts. It is also possible to carry out the hydrogenation in situ, i.e. in the same reaction mixture in which the metathetic degradation has previously taken place and without the need to isolate the degraded nitrite rubber. The hydrogenation catalyst is simply introduced into the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-OS-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. It is possible to use, for example, a catalyst of the general formula $(R^1_mB)_lMX_n$ where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis(triphenylphosphine)rhodium hydride of the formula $(C_6H_5)_3P)_4RhH$ and the corresponding compounds in which all or part of the triphenylphosphine has been replaced by tricyclohexylphosphine. The catalyst can be used in small amounts. An amount in the range 0.01-1% by weight, preferably in the range 0.03-0.5% by weight and particularly preferably in the range 0.1-0.3% by weight, based on the weight of the polymer, is suitable.

It is usually useful to use the catalyst together with a cocatalyst which is a ligand of the formula $R^1_mB$, where $R^1$, m and B are as defined above for the catalyst. Preference is given to m being 3, B being phosphorus and the radicals $R^1$ can be identical or different. The cocatalysts preferably have trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicycloalkylmonoaryl radicals.

Examples of cocatalysts may be found, for example, in U.S. Pat. No. 4,631,315. A preferred cocatalyst is triphenylphosphine. The cocatalyst is preferably used in amounts in the range 0.1-5% by weight, preferably in the range 0.3-4% by weight, based on the weight of the nitrile rubber to be hydrogenated. Furthermore, the weight ratio of the rhodium-containing catalyst to the cocatalyst is preferably in the range from 1:3 to 1:55, particularly preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst.

The practical procedure for carrying out this hydrogenation is adequately known to those skilled in the art from U.S. Pat. No. 6,683,136. The nitrile rubber to be hydrogenated is usually treated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber. Particular preference is also given to residual contents of double bonds in the HNBR of from 0 to 8%.

When heterogeneous catalysts are used, these are usually supported catalysts based on palladium which are supported, for example, on carbons, silica, calcium carbonate or barium sulphate.

After the hydrogenation is complete, a hydrogenated nitrile rubber having a Mooney viscosity (ML 1+4 at 100° C.), measured in accordance with ASTM standard D 1646, in the range 10-50, preferably from 10 to 30, is obtained. This corresponds to a weight average molecular weight $M_w$ in the range 2000-400000 g/mol, preferably in the range 20000-200000. Furthermore, the hydrogenated nitrile rubbers obtained have a polydispersity $PDI=M_w/M_n$, where $M_w$ is the weight average molecular weight and $M_n$ is the number average molecular weight, in the range 1-5 and preferably in the range 1.5-3.

Surprisingly, the negative effect observed by the use of copper salts in the metathesis of nitrile rubber does not occur when an alkaline earth metal chloride is added. At the same time, alkaline earth metal chlorides lead to a greater reduction in the molecular weight than when alkali metal salts, in particular LiCl, LiBr and LiI are added combined with a narrow molecular weight distribution.

However, the catalyst system according to the invention can be used successfully not only for the metathetic degradation of nitrile rubbers but also universally for other metathesis reactions. In a ring-closing metathesis process, the catalyst system according to the invention is brought into contact with the appropriate acyclic starting material, e.g. diethyl diallylmalonate.

The use of the catalyst systems according to the invention comprising metathesis catalyst and alkaline earth metal chloride enables, at comparable reaction times, the amount of the actual metathesis catalyst and thus the amount of noble metal to be significantly reduced compared to analogous metathesis reactions in which only the catalyst, i.e. without alkaline earth metal chloride, is used. When comparable noble metal contents are used, the reaction time is substantially shortened by addition of the alkaline earth metal chloride. When the catalyst systems are used for the degradation of nitrile rubbers, degraded nitrile rubbers having significantly lower molecular weights $M_w$ and $M_n$ can be obtained.

EXAMPLES

The following catalysts were used:

"Grubbs II Catalyst" (MW: 848.33 g/mol)

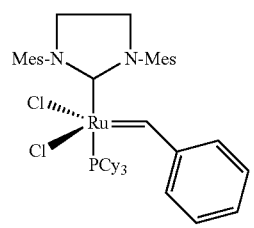

The Grubbs II catalyst was procured from Materia (Pasadena/Calif.).

"Hoveyda Catalyst" (MW: 626.14 g/mol)

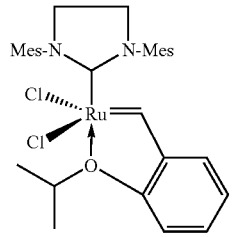

The Hoveyda catalyst was procured from Aldrich under the product number 569755.

"Grela Catalyst" (MW: 617.13 g/mol)

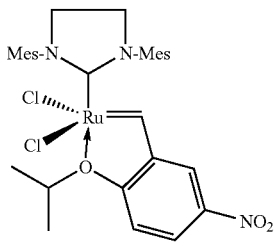

The Grela catalyst was prepared by the method published in J. Org. Chem. 2004, 69, 6894-6896.

General Method for the Metathetic Degradation of Nitrile Rubber ("NBR")

The degradation reactions described in the series of experiments 1 to 5 below were carried out using the nitrile rubber Perbunan® NT 3435 from Lanxess Deutschland GmbH. This nitrile rubber had the following characteristic properties:

Acrylonitrile content: 34% by weight
Mooney viscosity (ML 1+4 @ 100° C.): 31 Mooney units
Residual moisture content: 1.2% by weight
$M_w$: 186.832 g/mol
$M_n$: 60000 g/mol
PDI ($M_w/M_n$): 3.1

The metathetic degradation was in each case carried out using 293.3 g of chlorobenzene (hereinafter referred to as "MCB"/from Acros Organics) without further purification. 40 g of NBR were dissolved therein at room temperature over a period of 10 h. 0.8 g (2 phr) of 1-hexene was in each case added to the NBR-containing solution and the mixture was homogenized by stirring for 30 min.

The metathesis reaction was carried out using the amounts of starting materials indicated below in Table 1 at room temperature. The catalysts were in each case dissolved in 20 g of MCB at room temperature under argon. The amounts of catalyst used are summarized in Table 2. The catalyst solutions were added to the NBR solutions in MCB immediately after the preparation of the catalyst solutions. After the reaction times indicated in Table 3 below, about 5 ml were in each case taken from the reaction solutions and immediately admixed with about 0.2 ml of ethyl vinyl ether to stop the reaction and subsequently diluted with 5 ml of DMAc (N,N-dimethylacetamide) from Aldrich. 2 ml of the solutions were in each case introduced into a GPC bottle and diluted to 3 ml with DMAc. Before carrying out the GPC analysis, the solutions were in each case filtered by means of a 0.2 μm syringe filter made of Teflon (Chromafil PTFE 0.2 μm; from Machery-Nagel). The GPC analysis was then carried out using an instrument from Waters (Model 510). The analysis was carried out using a combination of 4 columns from Polymer Laboratories: 1) PLgel 5 μm Mixed-C, 300×7.5 mm, 2) PLgel 5 μm Mixed-C, 300×7.5 mm, 3) PLgel 3 μm Mixed-E, 300×7.5 mm, and 4) PLgel 3 μm Mixed-E, 300×7.5 mm.

The calibration of the GPC columns was carried out using linear poly(methyl methacrylate) from Polymer Standards Services. An RI detector from Waters (Waters 410) was used as detector. The analysis was carried out at a flow rate of 0.5 ml/min using DMAc as eluent. The GPC curves were evaluated using software from Millenium.

The following characteristic properties both of the original NBR rubber (before degradation) and of the degraded nitrite rubbers were determined by means of GPC analysis:

$M_w$ [kg/mol]: Weight average molar mass
$M_n$ [kg/mol]: Number average molar mass
PDI: Width of the molar mass distribution ($M_w/M_n$)

TABLE 1

Metathetic degradation of nitrile rubber: overview of the experiments carried out

| | Experiments | Catalyst | Salt addition Type | Amount [phr] |
|---|---|---|---|---|
| 1.01 | Comparative example | Grubbs (II) | — | — |
| 1.02 | Comparative example | Grubbs (II) | LiBr | 2 |
| 1.03 | Comparative example | Grubbs (II) | LiCl | 2 |
| 1.04 | Comparative example | Grubbs (II) | LiI | 2 |
| 1.05 | Example according to the invention | Grubbs (II) | CaCl$_2$ | 0.01 |
| 1.06 | Example according to the invention | Grubbs (II) | CaCl$_2$ | 0.05 |
| 1.07 | Example according to the invention | Grubbs (II) | CaCl$_2$ | 0.1 |
| 1.09 | Example according to the invention | Grubbs (II) | CaCl$_2$ | 0.5 |
| 1.09 | Example according to the invention | Grubbs (II) | CaCl$_2$ | 1 |
| 1.10 | Example according to the invention | Grubbs (II) | CaCl$_2$ | 2 |
| 1.11 | Example according to the invention | Grubbs (II) | CaCl$_2$ | 5 |
| 1.12 | Example according to the invention | Grubbs (II) | CaCl$_2$ | 10 |
| 2.01 | Comparative example | Hoveyda | — | — |
| 2.02 | Example according to the invention | Hoveyda | CaCl$_2$ | 2 |
| 3.01 | Comparative example | Grela | — | — |
| 3.02 | Example according to the invention | Grela | CaCl$_2$ | 2 |

TABLE 1-continued

Metathetic degradation of nitrile rubber: overview of the experiments carried out

| Experiments | Catalyst | Salt addition Type | Amount [phr] |
|---|---|---|---|
| 4.01 Comparative example | Grubbs (II) | $SnCl_2 \cdot 2H_2O$ | 2 |
| 4.02 Comparative example | Grubbs (II) | $SnCl_2 \cdot 2H_2O$ | 0.5 |
| 4.03 Comparative example | Grubbs (II) | $SnCl_2$ (anhydrous) | 2 |
| 4.04 Comparative example | Grubbs (II) | $SnCl_2$ (anhydrous) | 0.5 |
| 5.01 Comparative example | Grubbs (II) | $FeCl_2$ (anhydrous) | 2 |
| 5.01 Comparative example | Grubbs (II) | $FeCl_2$ (anhydrous) | 0.5 |

TABLE 2

| Catalyst | Molar amount n [mmol] | Amount m [mg] | phr |
|---|---|---|---|
| Grubbs II | 0.02357 | 20 | 0.05 |
| Grubbs Hoveyda | 0.02357 | 14.77 | 0.037 |
| Grela | 0.02357 | 15.8 | 0.0395 |

("phr" = parts per 100 parts of rubber", i.e. "parts by weight per 100 parts by weight of nitrile rubber")

1.00. Degradation of NBR Using the Grubbs II Catalyst 1.01. Comparative Experiment: Grubbs II Catalyst without Addition of a Salt

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | — | — | 23 |

| | Reaction time [min.] | | | | |
|---|---|---|---|---|---|
| Analytical data | 0 | 30 | 60 | 90 | 180 | 420 |
| $M_w$[kg/mol] | 186 832 | 117 542 | 99 937 | 84 396 | 64 982 | 53 852 |
| $M_n$[kg/mol] | 60 000 | 48 915 | 41 769 | 40 248 | 33 968 | 29 314 |
| PDI | 3.1 | 2.4 | 2.4 | 2.1 | 1.9 | 1.8 |

1.02 Comparative Experiment: Grubbs II Catalyst with Addition of 2 phr of LiBr

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | LiBr | 2 | 23 |

| | Reaction time [min.] | | | | |
|---|---|---|---|---|---|
| Analytical data | 0 | 30 | 60 | 90 | 180 | 420 |
| $M_w$[kg/mol] | 186 832 | 115 683 | 81 347 | 77 562 | 61 392 | 51 827 |
| $M_n$[kg/mol] | 60 000 | 48 347 | 38 775 | 40 796 | 34 147 | 28 793 |
| PDI | 3.1 | 2.4 | 2.1 | 1.9 | 1.8 | 1.8 |

1.03 Comparative Experiment: Grubbs II Catalyst with Addition of 2 phr of LiCl

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | LiCl | 2 | 23 |

| | Reaction time [min.] | | | | |
|---|---|---|---|---|---|
| Analytical data | 0 | 30 | 60 | 90 | 180 | 420 |
| $M_w$[kg/mol] | 186 832 | 121 905 | 71 885 | 56 724 | 31 683 | 21 337 |
| $M_n$[kg/mol] | 60 000 | 53 249 | 35 623 | 31 390 | 18 615 | 13 153 |
| PDI | 3.1 | 2.3 | 2.0 | 1.8 | 1.7 | 1.6 |

1.04 Comparative Experiment: Grubbs II Catalyst with Addition of 2 phr of LiI

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | LiI | 2 | 23 |

| | Reaction time [min.] | | | | |
|---|---|---|---|---|---|
| Analytical data | 0 | 30 | 60 | 90 | 180 | 420 |
| $M_w$[kg/mol] | 186 832 | 152 415 | 132 923 | 122 523 | 84 021 | 51 827 |
| $M_n$[kg/mol] | 60 000 | 58 620 | 55 382 | 53 268 | 39 571 | 28 793 |
| PDI | 3.1 | 2.6 | 2.4 | 2.3 | 2.1 | 1.8 |

1.05 Example According to the Invention: Grubbs II Catalyst with 0.01 phr of $CaCl_2$

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 0.01 | 23 |

| | Reaction time [min.] | | | | |
|---|---|---|---|---|---|
| Analytical data | 0 | 30 | 60 | 90 | 180 | 420 |
| $M_w$[kg/mol] | 186 832 | 118 048 | 80 122 | 70 878 | 38 924 | 25 212 |
| $M_n$[kg/mol] | 60 000 | 45 835 | 36 082 | 34 950 | 21 346 | 15 145 |
| PDI | 3.1 | 2.6 | 2.2 | 2.0 | 1.8 | 1.7 |

1.06 Example According to the Invention: Grubbs II Catalyst with 0.05 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 0.05 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 135 432 | 100 204 | 84 748 | 52 755 | 37 620 |
| $M_n$[kg/mol] | 60 000 | 54 808 | 42 803 | 39 701 | 27 289 | 21 185 |
| PDI | 3.1 | 2.5 | 2.3 | 2.1 | 1.9 | 1.8 |

1.07 Example According to the Invention: Grubbs II Catalyst with 0.1 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 0.1 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 106 206 | 72 551 | 58 789 | 33 847 | 21 642 |
| $M_n$[kg/mol] | 60 000 | 47 089 | 34 584 | 31 294 | 19 307 | 12 933 |
| PDI | 3.1 | 2.3 | 2.1 | 1.9 | 1.8 | 1.7 |

1.08 Example According to the Invention: Grubbs II Catalyst with 0.5 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 0.5 | 23 |

| | Reaction time [min.] | | | | | |
|---|---|---|---|---|---|---|
| Analytical data | 0 | 30 | 60 | 90 | 180 | 420 |
| $M_w$(kg/mol) | 186 832 | 108 891 | 74 219 | 52 432 | 31 465 | 19 615 |
| $M_n$[kg/mol] | 60 000 | 45 991 | 33 998 | 29 529 | 18 895 | 12 184 |
| PDI | 3.1 | 2.4 | 2.2 | 1.8 | 1.7 | 1.6 |

1.09 Example According to the Invention: Grubbs II Catalyst with 1 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 1 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 117 623 | 72 736 | 54 787 | 31 255 | 18 030 |
| $M_n$[kg/mol] | 60 000 | 51 933 | 35 284 | 27 448 | 18 296 | 10 955 |
| PDI | 3.1 | 2.3 | 2.1 | 2.0 | 1.7 | 1.6 |

1.10 Example According to the Invention: Grubbs II Catalyst with 2 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 2 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 84 409 | 61 838 | 44 220 | 25 228 | 16 827 |
| $M_n$[kg/mol] | 60 000 | 38 993 | 31 428 | 25 218 | 14 646 | 10 800 |
| PDI | 3.1 | 2.2 | 2.0 | 1.8 | 1.7 | 1.6 |

1.11 Example According to the Invention: Grubbs II Catalyst with 5 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 5 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 88 402 | 59 597 | 44 464 | 26 900 | 17 933 |
| $M_n$[kg/mol] | 60 000 | 37 704 | 29 340 | 24 415 | 15 978 | 11 324 |
| PDI | 3.1 | 2.3 | 2.0 | 1.8 | 1.7 | 1.6 |

1.12 Example According to the Invention: Grubbs II Catalyst with 10 phr of CaCl₂

| Grubbs II catalyst | | | Salt | | |
|---|---|---|---|---|---|
| Amount [mg] | Amount [phr] | Ru [ppm] | Type | Amount [phr] | Temperature [° C.] |
| 20 | 0.05 | 60 | $CaCl_2$ | 10 | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 95 414 | 64 055 | 45 408 | 26 883 | 15 974 |
| $M_n$[kg/mol] | 60 000 | 41 172 | 32 139 | 24 193 | 17 000 | 9 806 |
| PDI | 3.1 | 2.3 | 2.0 | 1.9 | 1.6 | 1.6 |

2.0 Degradation of NBR Using the Hoveyda Catalyst

2.01 Comparative Experiment: Hoveyda Catalyst without Addition of a Salt

| Hoveyda catalyst | | | Salt | | |
|---|---|---|---|---|---|
| Amount [mg] | Amount [phr] | Ru [ppm] | Type | Amount [phr] | Temperature [° C.] |
| 14.77 | 0.037 | 60 | — | — | 23 |

| | Reaction time [min.] | | | | | |
|---|---|---|---|---|---|---|
| Analytical data | 0 | 30 | 60 | 90 | 180 | 420 |
| $M_w$[kg/mol] | 186 832 | 53 835 | 49 500 | 48 033 | 48 402 | 47 425 |
| $M_n$[kg/mol] | 60 000 | 28 715 | 27 249 | 25 651 | 26 425 | 25 205 |
| PDI | 3.1 | 1.9 | 1.8 | 1.8 | 1.8 | 1.8 |

2.02 Example According to the Invention: Hoveyda Catalyst with 2 phr of CaCl₂

| Hoveyda catalyst | | | Salt | | |
|---|---|---|---|---|---|
| Amount [mg] | Amount [phr] | Ru [ppm] | Type | Amount [phr] | Temperature [° C.] |
| 14.77 | 0.037 | 60 | CaCl₂ | 2 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 33 063 | 22 800 | 20 092 | 16 384 | 13 045 |
| $M_n$[kg/mol] | 60 000 | 19 293 | 13 771 | 11 797 | 10 428 | 8 226 |
| PDI | 3.1 | 1.7 | 1.7 | 1.7 | 1.6 | 1.6 |

3.00 Degradation of NBR Using the Grela Catalyst

3.01 Comparative Experiment: Grela Catalyst without Addition of a Salt

| Grela catalyst | | | Salt | | |
|---|---|---|---|---|---|
| Amount [mg] | Amount [phr] | Ru [ppm] | Type | Amount [phr] | Temperature [° C.] |
| 15.8 | 0.0395 | 65 | — | — | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 48 336 | 48 742 | 46 987 | 46 579 | 45 662 |
| $M_n$[kg/mol] | 60 000 | 26 657 | 28 093 | 27 230 | 24 504 | 25 585 |
| PDI | 3.1 | 1.8 | 1.7 | 1.7 | 1.9 | 1.8 |

3.02 Example According to the Invention: Grela Catalyst with 2 phr of Calcium Chloride

| Grela catalyst | | | Salt | | |
|---|---|---|---|---|---|
| Amount [mg] | Amount [phr] | Ru [ppm] | Type | Amount [phr] | Temperature [° C.] |
| 15.8 | 0.0395 | 65 | CaCl₂ | 2 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 24 292 | 17 800 | 16 547 | 14 213 | 11 316 |
| $M_n$[kg/mol] | 60 000 | 14 574 | 11 047 | 10 519 | 9 390 | 7 008 |
| PDI | 3.1 | 1.7 | 1.6 | 1.6 | 1.5 | 1.6 |

4.01 Comparative Experiment: Grubbs II Catalyst with 2 phr of Tin(II) Chloride *2 H₂O

| Grubbs II catalyst | | Salt | | |
|---|---|---|---|---|
| Amount [mg] | Amount [phr] | Type | Amount [phr] | Temperature [° C.] |
| 20 | 0.05 | SnCl₂ * 2 H₂O | 2 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 182 823 | 103 018 | 95 448 | 94 975 | 89 419 |
| $M_n$[kg/mol] | 60 000 | 46 986 | 33 650 | 27 233 | 30 906 | 26 491 |
| PDI | 3.1 | 3.89 | 3.06 | 3.50 | 3.07 | 3.37 |

4.02 Comparative Experiment: Grubbs II Catalyst with 0.5 phr of Tin(II) Chloride * 2 H₂O

| Grubbs II catalyst | | Salt | | |
|---|---|---|---|---|
| Amount [mg] | Amount [phr] | Type | Amount [phr] | Temperature [° C.] |
| 20 | 0.05 | SnCl₂ * 2 H₂O | 0.5 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 97 588 | 99 369 | 82 183 | 75 589 | 75 197 |
| $M_n$[kg/mol] | 60 000 | 27 057 | 35 402 | 27 920 | 31 320 | 25 228 |
| PDI | 3.1 | 3.6 | 2.8 | 2.94 | 2.41 | 2.98 |

4.03 Comparative Experiment: Grubbs II Catalyst with 2 phr of Tin(II) Chloride (Anhydrous)

| Grubbs II catalyst | | Salt | | |
|---|---|---|---|---|
| Amount [mg] | Amount [phr] | Type | Amount [phr] | Temperature [° C.] |
| 20 | 0.05 | SnCl₂ | 2 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 138 602 | 129 318 | 132 987 | 155 772 | 132 360 |
| $M_n$[kg/mol] | 60 000 | 29 298 | 28 047 | 23 814 | 34 319 | 28 654 |
| PDI | 3.1 | 4.73 | 4.61 | 5.58 | 4.53 | 4.61 |

4.04 Comparative Experiment: Grubbs II Catalyst with 05 phr of Tin(II) Chloride (Anhydrous)

| Grubbs II catalyst | | Salt | | |
|---|---|---|---|---|
| Amount [mg] | Amount [phr] | Type | Amount [phr] | Temperature [° C.] |
| 20 | 0.05 | SnCl₂ | 0.5 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 172 740 | 179 958 | 165 102 | 195 872 | 172 011 |
| $M_n$[kg/mol] | 60 000 | 52 378 | 64 693 | 55 153 | 80 763 | 61 117 |
| PDI | 3.1 | 3.29 | 2.78 | 2.99 | 2.42 | 2.81 |

5.01 Comparative Experiment: Grubbs II Catalyst with 2 phr of Iron(II) Chloride (Anhydrous)

| Grubbs II catalyst | | Salt | | |
|---|---|---|---|---|
| Amount [mg] | Amount [phr] | Type | Amount [phr] | Temperature [° C.] |
| 20 | 0.05 | FeCl₂ | 2 | 23 |

| Analytical data | Reaction time [min.] | | | | |
|---|---|---|---|---|---|
| | 0 | 30 | 60 | 90 | 180 | 420 |
| $M_w$[kg/mol] | 186 832 | 164 895 | 130 683 | 116 729 | 99 024 | 78 434 |
| $M_n$[kg/mol] | 60 000 | 76 853 | 65 115 | 61 606 | 52 624 | 43 608 |
| PDI | 3.1 | 2.14 | 2.00 | 1.89 | 1.88 | 1.79 |

5.02 Comparative Experiment: Grubbs II Catalyst with 0.5 phr of Iron(II) Chloride (Anhydrous)

| Grubbs II catalyst | | Salt | | |
| --- | --- | --- | --- | --- |
| Amount [mg] | Amount [phr] | Type | Amount [phr] | Temperature [° C.] |
| 20 | 0.05 | FeCl$_2$ | 2 | 23 |

| Analytical data | Reaction time [min.] | | | | | |
| --- | --- | --- | --- | --- | --- | --- |
| | 0 | 30 | 60 | 90 | 180 | 420 |
| M$_w$[kg/mol] | 186 832 | 161 754 | 102 060 | 125 433 | 104 398 | 84 933 |
| M$_n$[kg/mol] | 60 000 | 69 453 | 73 226 | 63 871 | 57 623 | 46 604 |
| PDI | 3.1 | 2.32 | 2.01 | 1.96 | 1.81 | 1.82 |

6. Use of Cacl$_2$ for the Ring-Closing Metathesis of Diethyl Diallylmalonate The ring-closing metathesis of diethyl diallylmalonate using the Grubbs II catalyst (4.01 and 4.02) was carried out once without and once with 1 mg of CaCl$_2$. 10 mg of Grubbs II catalyst (0.0118 mmol) were weighed out into a sample bottle in a glove box and the bottle was closed with a septum and taken from the glove box. The catalyst was dissolved in 0.3 ml of chlorobenzene (not deuterated) and transferred into an NMR tube. The sample bottle was then rinsed with 0.2 ml of deuterated chloroform (CDCl$_3$) and the CDCl$_3$ was likewise transferred to the NMR tube. In the experiment using calcium chloride, about 1 mg of calcium chloride was also introduced into the NMR tube. The reaction was started by addition of 0.151 ml (0.625 mmol) of diethyl diallylmalonate (ALDRICH). The reactions proceeded at room temperature. A $^1$H NMR spectrum was recorded at defined time intervals.

The reaction conversions were determined by means of H NMR. The table below clearly shows the accelerating action of the addition of CaCl$_2$ on the ring-closing metathesis of diethyl diallylmalonate (DEDAM).

Ring-Closing Metathesis of DEDAM Using Grubbs II Catalyst:

| Reaction time [min] | Conversion (without CaCl$_2$) | Conversion (with CaCl$_2$) |
| --- | --- | --- |
| 0 | 0% | 0% |
| 5 | 35.1% | 37.9% |
| 15 | 71.4% | 77.3% |
| 30 | 87.8% | 96.4% |
| 60 | 97.7% | 100% |
| 90 | 100% | 100% |

What is claimed is:

1. A catalyst system comprising a metathesis catalyst which is a complex catalyst based on a metal of transition group 6 or 8 of the Periodic Table and has at least one ligand bound in a carbene-like fashion to the metal, and an alkaline earth metal chloride.

2. The catalyst system according to claim 1, wherein calcium chloride or magnesium chloride are used.

3. The catalyst system according to claim 1, wherein a complex catalyst based on molybdenum, tungsten, osmium or ruthenium is used.

4. The catalyst system according to claim 1, wherein compounds of the general formula (A),

(A)

where

M is osmium or ruthenium,

X$^1$ and X$^2$ are identical or different and are two ligands, the symbols L represent identical or different ligands, the radicals R are identical or different and are each hydrogen, an alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, which may in each case be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms, are used as catalyst.

5. The catalyst system according to claim 4, wherein X$^1$ and X$^2$ are identical or different and are each hydrogen, halogen, pseudohalogen, straight-chain or branched C$_1$-C$_{30}$-alkyl, C$_6$-C$_{24}$-aryl, C$_1$-C$_{20}$-alkoxy, C$_6$-C$_{24}$-aryloxy, C$_3$-C$_{20}$-alkyldiketonate, C$_6$-C$_{24}$-aryldiketonate, C$_1$-C$_{20}$-carboxylate, C$_1$-C$_{20}$alkylsulphonate, C$_6$-C$_{24}$-arylsulphonate, C$_1$-C$_{20}$-alkylthio, C$_6$-C$_{24}$-arylthio, C$_1$-C$_{20}$-alkylsulphonyl or C$_1$-C$_{20}$-alkylsulphinyl radicals.

6. The catalyst system according to claim 4, wherein X$^1$ and X$^2$ are identical or different and are each halogen, selected from the group consisting of fluorine, chlorine, bromine or iodine, benzoate, C$_1$-C$_5$-carboxylate, C$_1$-C$_5$-alkyl, phenoxy, C$_1$-C$_5$-alkoxy, C$_1$-C$_5$-alkylthio, C$_6$-C$_{24}$-arylthio, C$_6$-C$_{24}$-aryl or C$_1$-C$_5$-alkylsulphonate.

7. The catalyst system according to claim 4, wherein X$^1$ and X$^2$ are identical and are each selected from the group consisting of chlorine, CF$_3$COO, CH$_3$COO, CFH$_2$COO, (CH$_3$)$_3$CO, (CF$_3$)$_2$(CH$_3$)CO, (CF$_3$)(CH$_3$)$_2$CO, PhO (phenoxy), MeO (methoxy), EtO (ethoxy), tosylate (p-CH$_3$-C$_6$H$_4$-SO$_3$), mesylate (2,4,6-trimethylphenyl) or CF$_3$SO$_3$ (trifluoromethanesulphonate).

8. The catalyst system according to claim 4, wherein the two ligands L are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

9. The catalyst system according to claim 8, wherein the imidazolidine radical (Im) has a structure of the general formula (IIa) or (IIb)

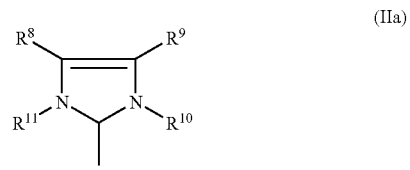

(IIa)

-continued

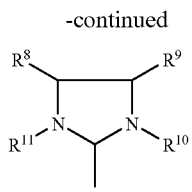
(IIb)

where
R$^8$, R$^9$, R$^{10}$, R$^{11}$ are identical or different and are each hydrogen, straight-chain or branched C$_1$-C$_{30}$-alkyl, C$_3$-C$_{20}$-cycloalkyl, C$_2$-C$_{20}$-alkenyl, C$_2$-C$_{20}$-alkynyl, C$_6$-C$_{24}$-aryl, C$_1$-C$_{20}$-carboxylate, C$_1$-C$_{20}$-alkoxy, C$_2$-C$_{20}$-alkenyloxy, C$_2$-C$_{20}$-alkynyloxy, C$_6$-C$_{20}$-aryloxy, C$_2$-C$_{20}$-alkoxycarbonyl, C$_1$-C$_{20}$-alkylthio, C$_6$-C$_{20}$-arylthio, C$_1$-C$_{20}$-alkylsulphonyl, C$_1$-C$_{20}$-alkylsulphonate, C$_6$-C$_{20}$-arylsulphonate or C$_1$-C$_{20}$ alkylsulphinyl where all the above radicals may be substituted.

10. The catalyst system according to claim 1, wherein catalysts of the general formula A1),

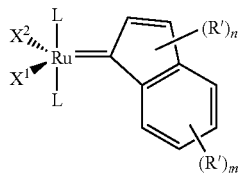
(A1)

where
X$^1$ and X$^2$ are identical or different and are two ligands
L represent identical or different ligands
n is 0, 1 or 2,
m is 0, 1, 2, 3 or 4 and
the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may in each case be substituted by one or more alkyl, halogen, alkoxy, aryl or heteroaryl radicals,
are used.

11. The catalyst system according to claim 1, wherein the catalyst has the structure (IV), (V) or (VI), where Cy is in each case cyclohexyl, Mes is 2,4,6-trimethylphenyl and Ph is phenyl.

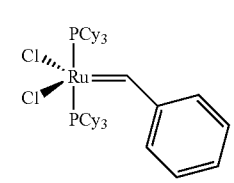
(IV)

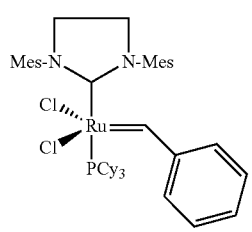
(V)

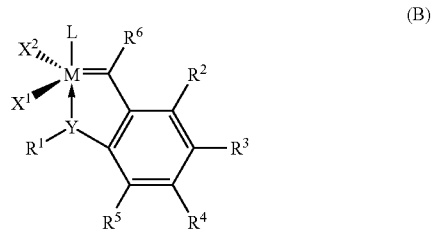
(VI)

12. The catalyst system according to claim 1, wherein catalysts of the general formula (B), (B)

where
M is ruthenium or osmium,
Y is oxygen (O), sulphur (S), an N—R$^1$ radical or a P—R$^1$ radical,
X$^1$ and X$^2$ are identical or different ligands,
R$^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
R$^2$, R$^3$, R$^4$ and R$^5$ are identical or different and are each hydrogen or an organic or inorganic radical,
R$^6$ is hydrogen or an alkyl, alkenyl, alkynyl or aryl radical and
L is a ligand selected from the group consisting of a phosphine, sulphonated phosphine, phosphate, phosphinite, phosphonite, arsine, stibine, ether, amine, amide, sulphoxide, carboxyl, nitrosyl, pyridine, thioether and imidazolidine ("Im") ligand,
are used.

13. The catalyst system according to claim 12, wherein L is a P(R$^7$)$_3$ radical, where the radicals R$^7$ are each, independently of one another, C$_1$-C$_6$-alkyl, C$_3$-C$_8$-cycloalkyl or aryl, or else is a substituted or unsubstituted imidazolidine radical ("Im").

14. The catalyst system according to claim 12, wherein X$^1$ and X$^2$ in the general formula (B) can have the meanings,
X$^1$ and X$^2$ are identical or different and are each hydrogen, halogen, pseudohalogen, straight-chain or branched C$_1$-C$_{30}$-alkyl, C$_6$-C$_{24}$-aryl, C$_1$-C$_{20}$-alkoxy, C$_6$-C$_{24}$-aryloxy, C$_3$-C$_{20}$-alkyldiketonate, C$_6$-C$_{24}$-aryldiketonate, C$_1$-C$_{20}$-carboxylate, C$_1$-C$_{20}$-alkylsulphonate, C$_6$-C$_{24}$-arylsulphonate, C$_1$-C$_{20}$-alkylthiol, C$_6$-C$_{24}$-arylthiol, C$_1$-C$_{20}$-alkylsulphonyl or C$_1$-C$_{20}$-alkylsulphinyl radicals,
X$^1$ and X$^2$ are identical or different and are each selected from the group consisting of fluorine, chlorine, bromine or iodine, benzoate, C$_1$-C$_5$-carboxylate, C$_1$-C$_5$-alkyl, phenoxy, C$_1$-C$_5$-alkoxy, C$_1$-C$_5$-alkylthiol, C$_6$-C$_{24}$-arylthiol, C$_6$-C$_{24}$-aryl or C$_1$-C$_5$-alkylsulphonate, $X^1$ and $X^2$ are identical and are each halogen, selected from the group consisting of chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$-$C_6H_4$-$SO_3$), mesylate (2,4,6-trimethylphenyl) or $CF_3SO_3$ (trifluoromethanesulphonate).

15. The catalyst system according to claim 1, wherein catalysts of the general formula (B1) are used,

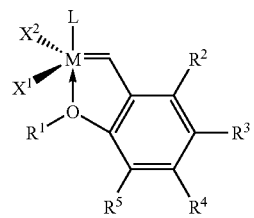

(B1)

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, and L selected from the group consisting of a phosphine, sulphonated phosphine, phosphate, phosphinite, phosphonite, arsine, stibine, ether, amine, amide, sulphoxide, carboxyl, nitrosyl, pyridine, thioether and imidazolidine ("Im") ligand.

16. The catalyst system according to claim 15, wherein catalysts of the general formula (B1) are used, in which M is ruthenium, $X^1$ and $X^2$ are both halogen, in particular chlorine, $R^1$ is a straight-chain or branched $C_1$-$C_{12}$-alkyl radical, $R^2$, $R^3$, $R^4$, $R^5$ are identical or different and are each hydrogen or an organic or inorganic radical, and L is selected from the group consisting of a phosphine, sulphonated phosphine, phosphate, phosphinite, phosphonite, arsine, stibine, ether, amine, amide, sulphoxide, carboxyl, nitrosyl, pyridine, thioether and imidazolidine ("Im") ligand.

17. The catalyst system according to claim 15, wherein catalysts of the general formula (B1) are used, in which M is ruthenium, $X^1$ and $X^2$ are both chlorine, $R^1$ is an isopropyl radical, $R^2$, $R^3$, $R^4$, $R^5$ are all hydrogen and L is a substituted or unsubstituted imidazolidine radical of the formula (IIa) or (IIb)

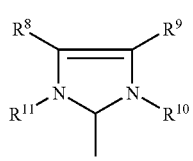

(IIa)

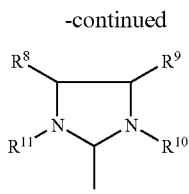

(IIb)

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

18. The catalyst system according to claim 15, wherein a catalyst of the structure (VII), (VIII), (IX), (X), (XI), (XII), (XIII), (XIV) or (XV) below, where Mes is in each case 2,4,6-trimethylphenyl, is used as catalyst of the general

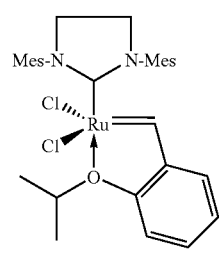

(VII)

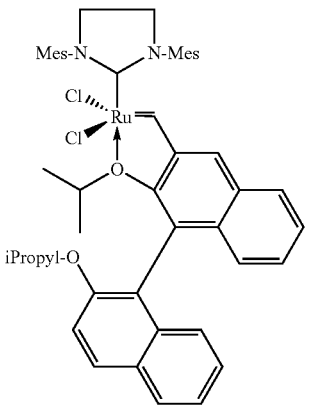

(VIII)

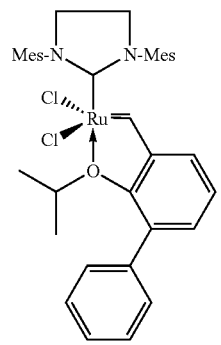

(IX)

-continued (X)
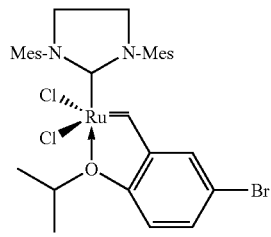

(XI)
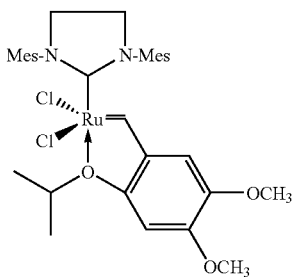

(XII)
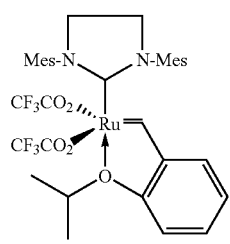

(XIII)
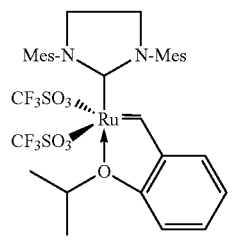

(XIV)
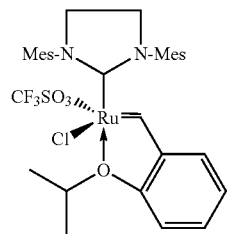

(XV)
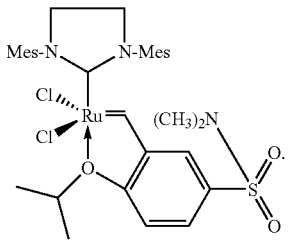

19. The catalyst system according to claim 1, wherein a catalyst of the general formula (B2) is used, (B2)
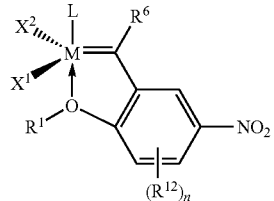

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^6$ is hydrogen or an alkyl, alkenyl, alkynyl or aryl radical and L is a ligand and are each, independently of one another, a phosphine, sulphonated phosphine, phosphate, phosphinite, phosphonite, arsine, stibine, ether, amine, amide, sulphoxide, carboxyl, nitrosyl, pyridine, thioether and imidazolidine ("Im") ligand, the radicals $R^{12}$ are identical or different and have the meanings, with the exception of hydrogen, mentioned for the radicals $R^2$, $R^3$, $R^4$ and $R^5$ in the general formula (B)

where $R^2$, $R^3$, $R^4$, $R^5$ are all hydrogen or an organic or inorganic radical and N is 0, 1, 2 or 3.

20. The catalyst system according to claim 19, wherein a catalyst of the structure (XVI) or (XVII), where Mes is in each case 2,4,6-trimethylphenyl, is used.

(XVI)
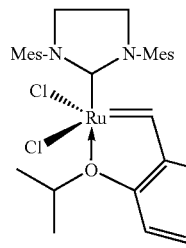

(XVII)
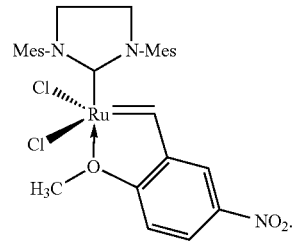

21. The catalyst system according to claim 11, wherein a catalyst of the general formula (B3), (B3)

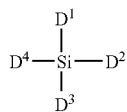

where $D^1$, $D^2$, $D^3$ and $D^4$ each have a structure of the general formula (XVIII) shown below which is bound via the methylene group to the silicon of the formula (B3),

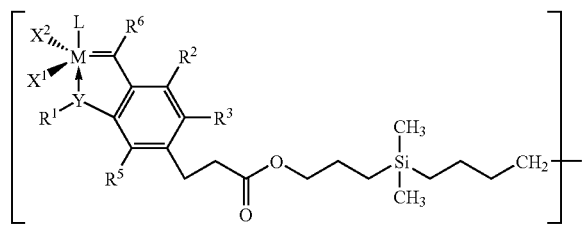

(XVIII)

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand in the formula (A) and are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand, is used.

22. The catalyst system according to claim 1, wherein a catalyst of the general formula (B4) is used,

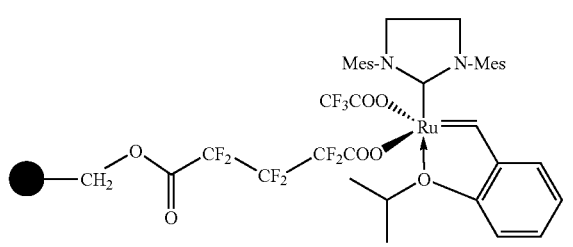

(B4)

wherein the symbol ● represents a support.

23. The catalyst system according to claim 1, wherein a catalyst of the general formula (C) is used,

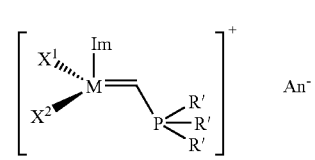

(C)

where

M is ruthenium or osmium, $X^1$ and $X^2$ are identical or different and are anionic ligands, R' are identical or different and are organic radicals, Im is a substituted or unsubstituted imidazolidine radical and An is an anion.

24. The catalyst system according to claim 1, wherein a catalyst of the general formula (D),

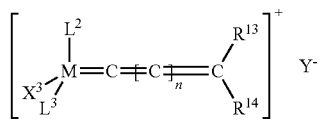

(D)

where

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged p-bonded ligand which may either be monocyclic or polycyclic, $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, $Y^-$ is a noncoordinating anion and n is 0, 1, 2, 3, 4 or 5, is used.

25. The catalyst system according to claim 1, wherein a catalyst of the general formula (E) is used,

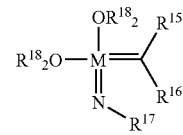

(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

26. The catalyst system according to claim 1, wherein a catalyst of the general formula (F),

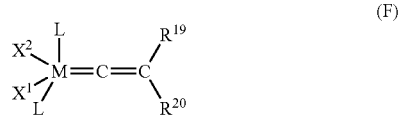

(F)

where

M is ruthenium or osmium, $X^1$ and $X^2$ are identical or different and are anionic ligands which can have all meanings of $X^1$ and $X^2$ in the general formula (A)

where $X^1$ and $X^2$ are identical or different and are each hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals or where $X^1$ and $X^2$ are identical or different and are each halogen, selected from the group consisting of fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate, the symbols L represent identical or different ligands which can have all meanings of L in the general formulae (A) and (B), and $R^{19}$ and $R^{20}$ are identical or different and are each hydrogen or substituted or unsubstituted alkyl, is used.

27. The catalyst system according to claim 1, wherein a catalyst of the general formula (G), (H) or (K) is used,

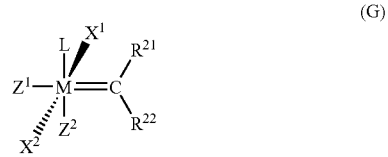

(G)

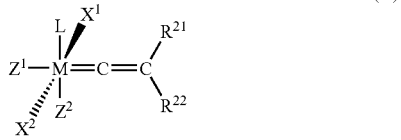

(H)

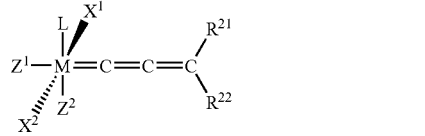

(K)

where

M is osmium or ruthenium, $X^1$ and $X^2$ are identical or different and are two ligands, L is a ligand, $Z^1$ and $Z^2$ are identical or different and are uncharged electron donors, $R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which may in each case optionally be substituted by one or more radicals selected from among alkyl, halogen, alkoxy, aryl or heteroaryl.

28. The catalyst system according to claim 1, wherein the metathesis catalyst and the alkaline earth metal chloride are used in a weight ratio of alkaline earth metal chloride:metathesis catalyst of from 0.01:1 to 10000:1.

29. A method of using the catalyst system according to claim 1 comprising subjecting one or more starting molecules to a metathesis reaction in the presence of a catalyst system according to claim 1.

30. The method according to claim 29 for reducing the molecular weight of a nitrile rubber, comprising contacting a nitrile rubber containing repeating units derived from at least one conjugated diene, at least one α,β-unsaturated nitrile and optionally one or more further copolymerizable monomers, if appropriate in the presence of a coolefin, with the catalyst system according to claim 1.

31. The method according to claim 29 or 30, wherein the alkaline earth metal chloride is added in a dispersant or without a dispersant to the catalyst or a solution of the catalyst.

32. The method according to claim 30, wherein the amount of the catalyst present in the catalyst system is from 1 to 1000 ppm of noble metal.

33. The method according to claim 30, wherein the metathesis of the nitrile rubber is followed by a hydrogenation.

34. The catalyst system according to claim 4 wherein the radicals R are selected from the groups consisting of $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl radical.

35. The method according to claim 31, wherein the amount of the catalyst present in the catalyst system is in the range from 2 to 500 ppm of noble metal, based on the nitrite rubber used.

36. The catalyst system according to claim 13 where radicals $R^7$ has the structure of one of the general formulae (IIa) or (IIb)

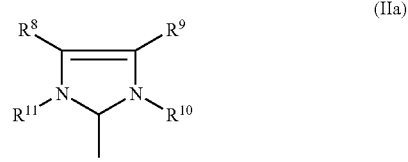

(IIa)

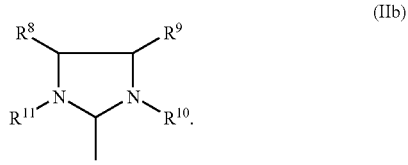

(IIb)

37. The catalyst system according to claim 13 where radicals $R^7$ has the structure of one of the following structures (IIIa) to (IIIf), where Mes is in each case a 2,4,6-trimethylphenyl radical or alternatively in each case a 2,6-diisopropylphenyl radical

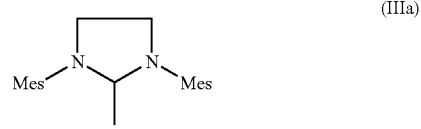

(IIIa)

-continued
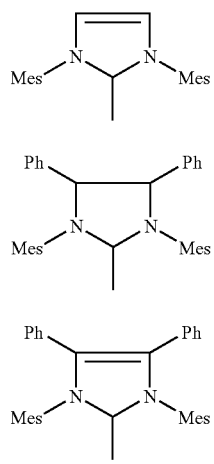
(IIIb)
(IIIc)
(IIId)
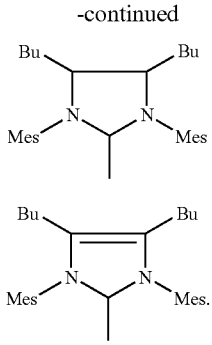
(IIIe)
(IIIf)
38. The metathesis reaction according to claim 29 wherein the metathesis reaction is a ring-closing metatheses (RCM), cross metatheses (CM) or a ring-opening methatheses (ROMP).
* * * * *